(12) United States Patent
Singh et al.

(10) Patent No.: US 11,836,275 B2
(45) Date of Patent: Dec. 5, 2023

(54) CAPTURE AND PRESENTATION OF AUTHENTICATED DATA

(71) Applicant: Patung Investments Ltd., Surrey (CA)

(72) Inventors: Parminder Singh, Surrey (CA);
Randeep Gagan Singh, Surrey (CA);
Amardeep Nanak Singh, Surrey (CA)

(73) Assignee: PATUNG INVESTMENTS LTD., Surrey (CA)

( * ) Notice: Subject to any disclaimer, the term of this patent is extended or adjusted under 35 U.S.C. 154(b) by 254 days.

(21) Appl. No.: 17/058,768

(22) PCT Filed: May 21, 2019

(86) PCT No.: PCT/IB2019/000519
§ 371 (c)(1),
(2) Date: Nov. 25, 2020

(87) PCT Pub. No.: WO2019/229519
PCT Pub. Date: Dec. 5, 2019

(65) Prior Publication Data
US 2021/0200903 A1     Jul. 1, 2021

Related U.S. Application Data

(60) Provisional application No. 62/679,021, filed on Jun. 1, 2018.

(51) Int. Cl.
*G06F 21/16*     (2013.01)
*G06F 21/64*     (2013.01)
(Continued)

(52) U.S. Cl.
CPC ............ *G06F 21/645* (2013.01); *G06F 21/16* (2013.01); *H04L 9/3236* (2013.01);
(Continued)

(58) Field of Classification Search
CPC .. G06F 21/16; G06F 21/64; G06F 2221/0724; G06F 2221/0737;
(Continued)

(56) References Cited

U.S. PATENT DOCUMENTS 6,111,517 A     8/2000     Atick et al.
6,938,159 B1     8/2005     O'Connor et al.
(Continued)

FOREIGN PATENT DOCUMENTS

EP     0 890 262 B1     7/2006

OTHER PUBLICATIONS

International Search Report and Written Opinion PCT application No. PCT/IB2019/000519, dated Oct. 3, 2019, pp. 11.
(Continued)

*Primary Examiner* — Eric W Shepperd
(74) *Attorney, Agent, or Firm* — Maschoff Brennan

(57) ABSTRACT

Techniques for continuous authenticity for captured data are provided. Data in form of analog or digital media including videos, images, and audio recordings, and sensed, detected, measured, observed, or otherwise recorded data may be authenticated with source information upon capture. The chain of custody of the authentication may be preserved throughout processing and distribution of the captured data through a distribution network assuring consumers of the data that data or source information for the data is not altered in any way or, if altered, it is done so for the purpose of preserving the authenticity of the data and reversing the process will render an unaltered version of the original data set. In some examples, the authentication and/or capture of data may be triggered by a predefined event to ensure data associated with the event is captured and preserved with authentication.

26 Claims, 9 Drawing Sheets

(51) Int. Cl.
*H04L 9/32* (2006.01)
*H04L 9/40* (2022.01)
*H04L 67/12* (2022.01)
*H04L 9/00* (2022.01)

(52) U.S. Cl.
CPC .......... *H04L 9/3247* (2013.01); *H04L 63/123* (2013.01); *G06F 2221/2115* (2013.01); *H04L 9/50* (2022.05); *H04L 67/12* (2013.01)

(58) Field of Classification Search
CPC ............. G06F 2221/074; H04L 9/3236; H04L 9/3239; H04L 9/3247; H04L 2209/605; H04L 2209/608; H04N 21/83; H04N 21/835; H04N 21/8352; H04N 21/8358
See application file for complete search history.

(56) References Cited

U.S. PATENT DOCUMENTS

| | | | | |
|---|---|---|---|---|
| 2004/0039929 | A1* | 2/2004 | Decime | H04L 9/321 |
| | | | | 713/193 |
| 2004/0107368 | A1* | 6/2004 | Colvin | G06F 21/121 |
| | | | | 726/30 |
| 2005/0132200 | A1* | 6/2005 | Jaffe | H04N 1/32128 |
| | | | | 713/176 |
| 2006/0036853 | A1* | 2/2006 | Chen | G06Q 20/3674 |
| | | | | 713/161 |
| 2006/0109515 | A1* | 5/2006 | Zhao | G09C 5/00 |
| | | | | 382/100 |
| 2006/0159312 | A1 | 7/2006 | Chiang et al. | |
| 2011/0055765 | A1* | 3/2011 | Neubrand | H04N 1/32122 |
| | | | | 713/400 |
| 2011/0283362 | A1* | 11/2011 | Horneff | H04H 20/38 |
| | | | | 455/3.06 |
| 2012/0191709 | A1* | 7/2012 | Morrison | G06F 16/58 |
| | | | | 707/E17.014 |
| 2014/0136789 | A1* | 5/2014 | Madan | G06F 17/00 |
| | | | | 711/133 |
| 2014/0289532 | A1* | 9/2014 | Kako | H04L 9/3247 |
| | | | | 713/176 |
| 2014/0334491 | A1* | 11/2014 | Pazhayakath | H04L 45/38 |
| | | | | 370/392 |
| 2015/0199502 | A1* | 7/2015 | Chen | G06F 21/32 |
| | | | | 705/325 |
| 2015/0278206 | A1* | 10/2015 | Lytell | H04N 5/772 |
| | | | | 348/231.6 |
| 2016/0283920 | A1 | 9/2016 | Fisher et al. | |
| 2017/0154184 | A1* | 6/2017 | Shivanna | G06F 21/57 |
| 2017/0206523 | A1* | 7/2017 | Goeringer | G06F 21/45 |
| 2020/0348924 | A1* | 11/2020 | Park | G06F 21/57 |

OTHER PUBLICATIONS

Klosterman, Andrew J. and Ganger, Gregory R., "Secure Continuous Biometric-Enhanced Authentication (CMU-CS-00-134)" May 2000, pp. 25.

Koichiro Niinuma et al., "Soft Biometric Traits for Continuous User Authentication", Dec. 2010, pp. 10.

* cited by examiner

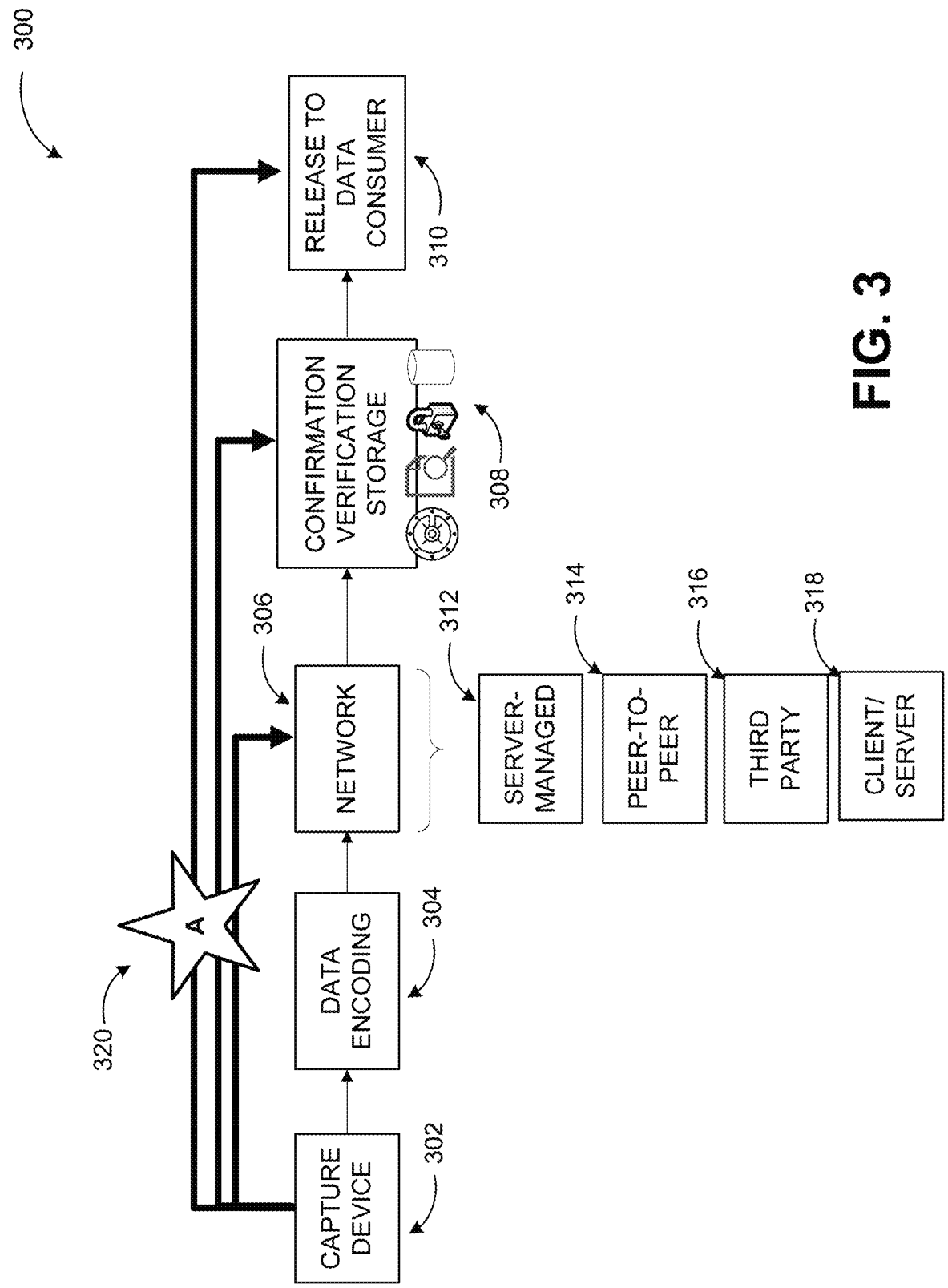

COMPUTER PROGRAM PRODUCT 800

SIGNAL BEARING MEDIUM 802

804 ONE OR MORE INSTRUCTIONS TO:

CAPTURE OR RECEIVE CAPTURED DATA;
RECEIVE AUTHENTICATION OF SOURCE INFORMATION FOR THE CAPTURED DATA;
PROCESS THE CAPTURED DATA FOR DISTRIBUTION TO ONE OR MORE CONSUMERS OF THE CAPTURED DATA;
PRESERVE THE CHAIN OF CUSTODY OF THE AUTHENTICATION OF THE SOURCE INFORMATION FOR THE CAPTURED DATA IS BY MAINTAINING THE AUTHENTICATION OF THE SOURCE INFORMATION WITH THE CAPTURED DATA AND ASSURING THE AUTHENTICATION OF THE SOURCE INFORMATION IS NOT MODIFIED THROUGHOUT THE PROCESSING; AND/OR
PROVIDE THE PROCESSED DATA FOR PRESENTATION TO A CONSUMER OF THE CAPTURED DATA ALONG WITH THE AUTHENTICATION OF THE SOURCE INFORMATION FOR THE CAPTURED DATA.

| COMPUTER-READABLE MEDIUM 806 | RECORDABLE MEDIUM 808 | COMMUNICATIONS MEDIUM 810 |

FIG. 8

CAPTURE AND PRESENTATION OF AUTHENTICATED DATA

CROSS-REFERENCE TO RELATED APPLICATIONS

This application is a U.S. National Stage filing under 35 U.S.C. § 371 of International Application PCT/IB2019/000519, filed May 21, 2019, which claims the benefit of U.S. Provisional Patent Application Ser. No. 62/679,021 filed on Jun. 1, 2018. The disclosures of the above-referenced applications are hereby incorporated by reference for all purposes.

BACKGROUND

Data in various forms may come under scrutiny in legal, business, social, and other settings for authenticity. Often, information may not be trusted for potentially having been altered and therefore may not be used to support arguments for or against a specific situation such as to support and vindicate individuals or organizations of wrongdoing, malfeasance or other various reasons. Such data may include security camera footage, video camera footage, cell phone videos, dashcam, sensed data (e.g., physiological), experimental data, bodycam recordings and law enforcement and military video recordings, essentially any data that can be capturable in any form at the earliest moment that it is transformed form the analog to digital formats. Additionally, the advent of "fake news" has further stoked doubt as to the trustworthiness, authenticity and originality of digital media. Supported by advancements in technology, a once protected data set can be modified in real-time at the moment it is captured. As an example, original voice tracks, backgrounds, motion and movement, actions, facial images, the image or location can all be modified in real-time or via post processing of the date to an almost undetectable granularity to suit the specific needs of the individual altering or have the data altered. In essence, if left unchecked, the data itself can the positioned to be taken out of context and modified to support alternative positions. There is a demand by the many sectors of the general public and industry to be made aware when any captured data set is altered in any way.

An increasing number of service providers provide a way for documentation containing sensitive information to be delivered over a network to be read, signed and returned in a safe and secure manner. Software developed by these companies ensures that the signature is authentic and the document was signed by the intended party. Such documentation may include mortgage closings, mergers, acquisitions, divorce proceedings and other contracts and transactions that require confidentiality, privacy and security. However, approaches for proving authenticity of such documents are not transferable to other forms of data such as videos, audio recordings, and other data sets that can be captured.

To provide an illustrative example, video forgery algorithms (or any data forgery algorithms for that matter), such as deep fake algorithm, are becoming increasingly sophisticated. By generating a fake face through a deep learning neural network, such algorithms are able to replace a real face with a fake face in real time and do it in purposeful way using way using advancement in Artificial Intelligence (AI) and Machine Learning (ML). Increased use of forgery algorithms makes the Internet and valuable resources within the Internet suspicious resulting in a disturbing social phenomenon. With existing technologies, digital watermarks may be added to images, videos, and audio files or streams to ensure the authenticity of distributed media. However, the use of such technologies is typically controlled by producers of the media rather than by a speaker within a video. In a broader sense, data set authenticity should be not be controlled by the author, it should be independently verified by an unbiased source. For example, a media source, such as a TV station, can forge an interview video using the deep fake algorithm after interviewing a public figure and then add digital watermarks into the fake video thus produced.

SUMMARY

Data in form of analog or digital media including, but not limited to, videos, images, and audio recordings, and sensed, detected, measured, observed, or otherwise recorded data (i.e., any data set that can be recorded, captured, stored, and replayed) may be authenticated with source information upon capture. The chain of custody of the authentication may be preserved throughout processing and distribution of the captured data through a managed (e.g., server-client) or peer-to-peer distribution network assuring consumers of the data that data or source information for the data is not modified or if modified there is the high level of confidence that such modification can and will be detected and noted. In some examples, the authentication and/or capture of data may be triggered by a predefined event to ensure data associated with the event is captured and preserved with authentication.

In a world full of (and increasing) sensors and data capturing devices (cell phones, video game consoles, body sensors) the amount of data being captured, stored, and played back is increasing at an unprecedented rate. This proliferation coupled with an increasing amount of technology (hardware and software) that is purposely designed to allow the user to alter almost any captured data set creates a market demand to know when a data set has been altered and when it retains its authenticity. Further, to retain the quality and integrity of the originally captured analog data, analog signals are very often transformed into a noise immune digital format. If, at the first possible moment when the data is transformed into a digital format, the digital data is captured and an advanced ai algorithm is used to capture unique parameters of the captured digital data set such as size, shape, bits, bytes, granularity, timing, cyclical redundancy check (CRC), multidimensional CRC, the number of one's and zero's in a set, or a size of strings of characters, collectively, "Data Alterations Detection", in such a manner that if the content of the captured digital data is altered in any way the data alterations detection (process and/or algorithm) would recognize the alteration from the original data set when compared would be deemed as altered and non-authentic.

BRIEF DESCRIPTION OF THE DRAWINGS

The accompanying drawings, which are incorporated in and form a part of the specification, illustrate the embodiments of the present disclosure and together with the written description serve to explain the principles, characteristics, and features of the present disclosure. In the drawings:

FIG. 3 depicts example major operations and components in a system with continuous authentication chain of custody for providing captured data to a data consumer in accordance with some embodiments.

FIG. 8 illustrates and example computer program product to provide computer-executable instructions for providing captured data to a data consumer with continuous authentication chain of custody in accordance with some embodiments.

DETAILED DESCRIPTION

Figure 1:
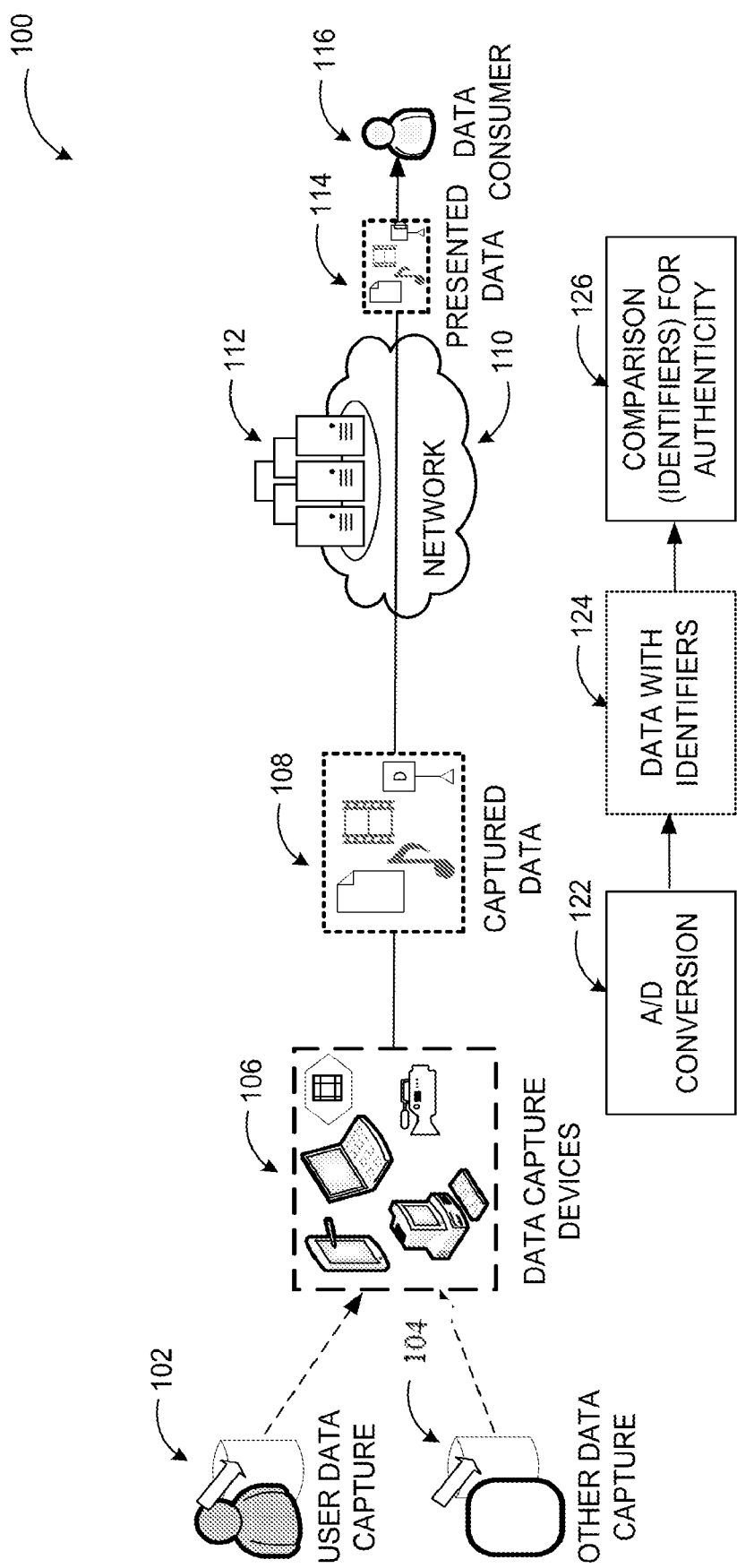
FIG. 1 depicts a typical data capture and presentation system that may be used to disseminate data of various types from a source to one or more data consumers.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to capture and presentation of authenticated data through continuous chain of custody.

Briefly stated, technologies are generally described to provide continuous authenticity for captured data. Data in form of analog or digital media including videos, images, and audio recordings, and sensed, detected, measured, observed, or otherwise recorded data may be authenticated with source information upon capture. The chain of custody of the authentication may be preserved throughout processing and distribution of the captured data through a distribution network assuring consumers of the data that data or source information for the data is not altered in any way or, if altered, it is done so for the purpose of preserving the authenticity of the data and reversing the process will render an unaltered version of the original data set. In some examples, the authentication and/or capture of data may be triggered by a predefined event to ensure data associated with the event is captured and preserved with authentication.

While some embodiments are directed to digital or digitized data, other embodiments are directed to analog data. In real world most data, if not all, is in analog form. Analog data can be digitized at various stages (as soon as it is captured, any time during processing, etc.). In the digital/ digitized data embodiments, authentication identifiers may be determined or inserted as soon as the data is digitized or digital data is captured, and the data then examined throughout the processing/storage/distribution system to preserver continuous authenticity or detect any alterations. In analog embodiments, where captured analog data may be processed, stored, and/or distributed in analog format, authentication identifiers may be determined and/or inserted at capture time and examined through the processing, storage, distribution stages. The authentication identifiers may also be analog data.

In some examples of analog data authentication, the identifiers may include, but are not limited to, a visible or invisible video signal (or still image) for analog video signals, an audible or inaudible audio signal for analog video or audio signals, etc. Following are some illustrative example scenarios. An analog video signal (for example, a person speaking) may be captured along with a visible or invisible (e.g., infrared or ultraviolet) authenticity signal in the background. The authenticity signal may be independent of the captured analog video signal, for example, periodically repeating or continuously varying. Thus, if the captured analog video is altered (e.g., portions removed), the alteration may be detected by examining the video authenticity signal. If the video authenticity signal is inconspicuous (e.g., invisible), an alterer of the captured analog video signal may not even realize their alteration can be detected simply by examining the authenticity signal.

In another example scenario, an audible or inaudible (e.g., below or above the audible spectrum) audio authenticity signal may be played in the background of captured analog audio or video signal, or the audio authenticity signal may also be inserted into the captured analog signal at the time of capture. Thus, the captured analog audio or video signal may be examined at any stage of the storage, processing, distribution system by checking the audio authenticity signal and any alterations may be detected. Analog authenticity confirmation may provide a degree of confidence in the analog data as opposed to absolute confidence that may be provided in digitized or digital signals. Analog embodiments are not limited to captured analog video or audio signals. Other forms of captured analog data such as sensor data and similar ones may also be examined for authenticity or alteration through the use of analog identifiers.

Embodiments are not limited to strictly distinct analog and digital/digitized data. The herein described techniques for different data formats may be combined in various ways to provide different levels of continuous authentication confirmation. For example, analog identifiers as discussed above may be used in the captured analog data, which may subsequently be digitized and additional digital authentication identifiers may be used as well.

FIG. 1 depicts a typical data capture and presentation system that may be used to disseminate data of various types from a source to one or more data consumers.

Diagram 100 shows a system, where a user 102 may capture data through one or more data capture devices 106 such as a handheld device to record one or both of digital or analog data including, but not limited to, a cell phone, a video recorder, a camera, a microphone, a data acquisition unit, a medical device, physiological sensor, etc. Data may also be captured through other data capture methods 104 such as automatic or triggered capture of data through a data acquisition unit, a medical device, an Internet of Things (IoT) sensor, a thermal sensor, a spectral sensor, a health sensor, motion or movement sensor, etc. In some examples, health sensors may include one or more of a concussion sensor, a motion sensor, an oxygen sensor, a pulse sensor, a personal security sensor, a temperature sensor, a blood pressure sensor, a heart rate sensor, a hormone sensor, a glucose sensor, or a biomarker sensor. Medical devices may include a heart monitor electrocardiogram (EKG), an oxygen saturation machine, a dialysis machine, vital sign monitoring machines, electroencephalogram (EEG) monitors, etc. The data capture devices 106 may also include non-handheld devices such as a security camera, electrodes, a body camera, a helmet camera, a dash camera, etc. Essentially, any device that is capable of data capture in any form may be used in implementing various embodiments. Further examples may include, but are not limited to, virtual reality and augmented reality system as being devices that can generate data that needs to be authenticated, recorded, and stored, as well as, being devices where authentic data can be consumed (e.g., viewed).

The captured data 108 may include analog or digital media, for example, videos, images, and audio recordings, and/or sensed, detected, measured, observed, or otherwise recorded data such as recordings with audio, video, and other components. Captured data 108 may include audio and/or video recording of a person, a group of people, an online conference, or an environment. Captured data may further include medical data such as bodily functions and parameters captured by sensors affixed to the body or that can sense from afar (e.g., motion capture systems). Captured data may also include environmental data such as temperature, humidity, precipitation, wind, light levels, seismic information, etc., captured by sensors for a particular environment. Captured data may be combined, overlaid, or infused together to generate an entirely new set of derivative date. For example, pollen sensing may be combined with a physiologic peripheral capillary oxygen saturation ($SPO_2$) sensor to obtain a conclusion that the individual has a congested nose or chronic issues.

The captured data 108 may be processed, stored, and/or distributed to consumers such as presented data 114 to data consumer 116 through one or more computing devices 112 such as servers, routers, and special purpose devices that may be configured as peer-to-peer networks, client-server architectures or similar managed networks. The computing devices 112 may communicate with each other, data capture devices 106, and data consumer devices through a network 110. The processing may include filtering, digitizing, categorizing, annotating, enhancing, modifying resolution or similar properties, reducing size, and other comparable actions. In some cases, the data may be stored indefinitely at networked storage devices and made available to data consumers as part of a business transaction, for example. In other cases, the data may be stored for a limited time or not stored at all (e.g., live-stream). The data may also be stored for a user defined time period. The original data set may also be compared and displayed in comparison with data that is suspected to have been altered from the originally captured data set. The captured data 108 may flow through standardized interfaces such as a web browser or a software application or custom proprietary software. For example, the captured data 108 may be delivered over one or more of a Voice over IP (VoIP) or Video over IP (VoIP) or other protocol that may conform to the open systems interconnection (ISO) 7-layer model or standard data transmission protocols. In some embodiments, the captured data 108 may be recorded onto a local memory device such as one or more of a hard drive, compact disk (CD), magnetic tape or thumb drive, online storage, and provided to the distribution network or directly to the data consumer 116.

Blocks 122, 124, and 126 illustrate an example continuous authentication process over a system such as the system of diagram 100. In some embodiments, captured data may be analog and converted to digital format (122). An artificial intelligence (AI) algorithm or similar method may be used during the conversion to uniquely capture the data set such that there are clear identifiers (124) present within the digital data to allow detection through Data Alterations Detection if a bit or byte is altered or a sequence of bits or bytes are changed. Data in various stages of the distribution network (including presentation to the data consumer 116) may be confirmed as authentic (or indicated as altered) in response to a comparison (126) using the data alteration detection identifiers. The comparison may be performed at one or more servers or other devices of the network 110 or even by a device presenting the data to the data consumer 116.

As mentioned previously, data may not be trusted, in some cases, for potentially having been altered in post capture processing or modified in real time to satisfy the needs of the user and therefore may not be used for various purposes. According to some embodiments captured data may be authenticated with source information upon capture. The chain of custody of the authentication may be preserved throughout processing and distribution of the captured data through a managed or peer-to-peer (or other architectures) distribution network assuring consumers of the data that data or source information for the data is not modified.

Figure 2A:
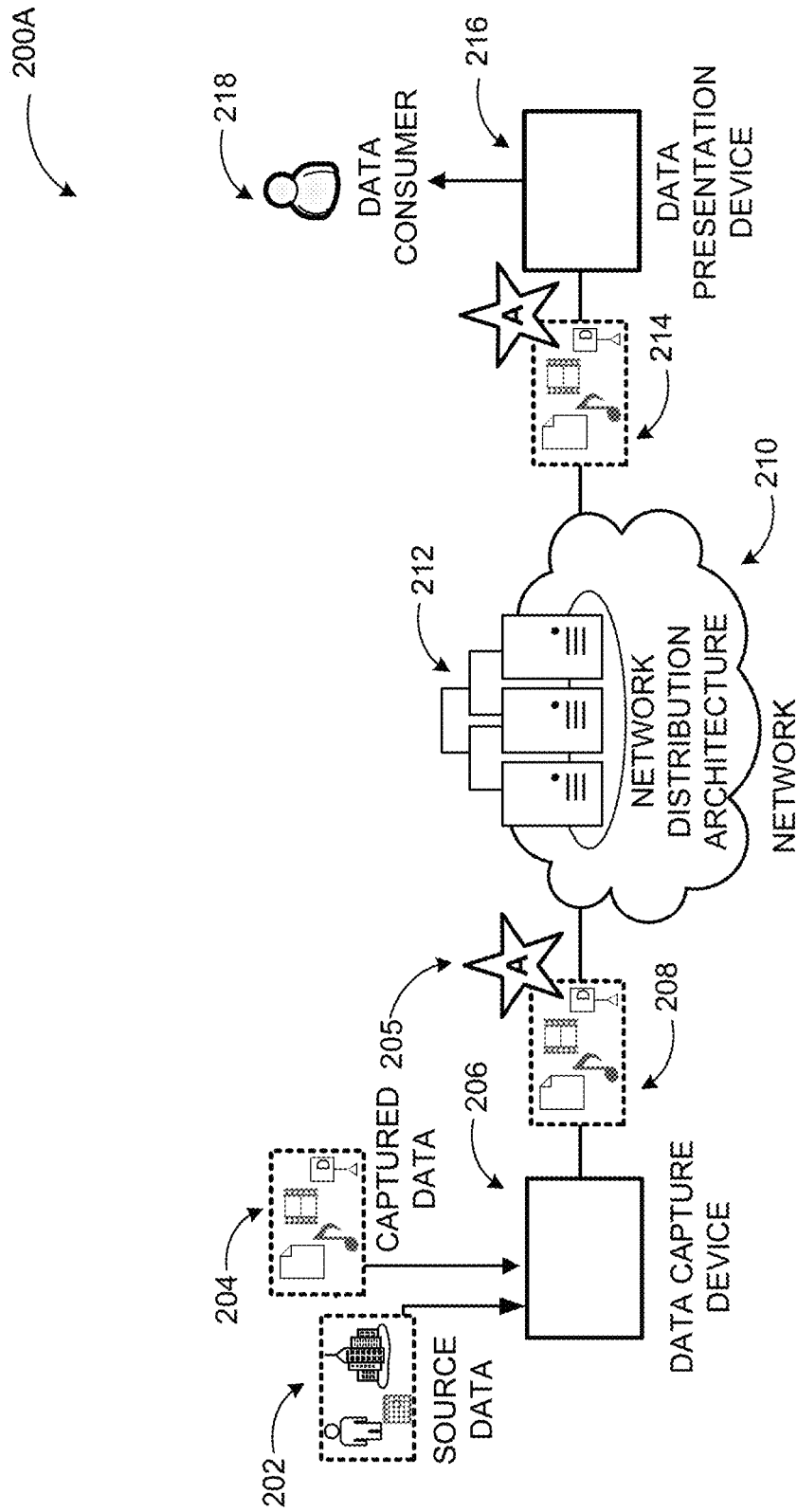
FIG. 2A depicts an example system according to some embodiments, where captured data may be provided to a data consumer via a managed network architecture with continuous authentication chain of custody.

FIG. 2A depicts an example system according to some embodiments, where captured data may be provided to a data consumer via a managed network architecture (e.g., server-client architecture) with continuous authentication chain of custody. The data delivery (with authentication) may also be time-driven (synchronous or asynchronous) or event-driven (every time the original data is transported between software and hardware modules).

As shown in diagram 200A, a data capture device 206 may capture data 204 and also receive source data 202 to generate source-authenticated captured data 208. The captured data 204 may include analog or digital media such as videos, images, and audio recordings, and/or sensed, detected, measured, observed, or otherwise recorded data such as recordings with audio, video, and other components. The captured data may be authenticated during capture or as soon as it is digitized (earliest possible time point upon digitization). In addition to examples such as audio and/or video recording of a person, a group of people, an online conference, or an environment, captured data 204 may also include medical data such as bodily functions and parameters captured by sensors or environmental data such as temperature, humidity, precipitation, wind, light levels, seismic information, etc., captured by sensors for a particular environment. The source data 202 to authenticate the captured data 204 may include, but is not limited to, identity of a person associated with the captured data, identity of a location associated with the captured data, a time stamp, a geo-location stamp, or a portion of the captured data. In some examples, multiple types of source data may be used in combination with each other to authenticate the captured data or in combination with bit or byte patterns in a row, column, place, or any number of multi-dimensional authentication structures that are predefined by the application or implemented system. For example, the source data may be facial recognition of a person captured in a video, speech of a person captured in a video or audio, picture of an object (e.g., a car in an accident) captured as part of a video, etc. Further examples may include a finger print that is unaltered. A system according to embodiments may also provide a probability of match ($P_m$) as in the case of fingerprint comparison or signature match when comparing two multi-vector data sets].

The source-authenticated captured data 208 may include authentication 205 in some examples. The authentication 205 may be a signature used to sign the captured data (e.g., a private key in a public/private key pair). Various authentication formats may also be used in combination with each other to authenticate the captured data or in combination bit or byte patterns in a row, column, place, or any number of multi-dimensional structures that is predefined by the application or implemented system. The signature may include, but is not limited to, a cryptographic hash function, an overlay, a logo, an invisible marker, or a visible marker that can be superimposed in a separate layer or embedded into the data set such that it can be removed with a correct key rendering the originally captured data. The signature may be integrated with the captured data 204 and provided to one or more servers 212 in a distribution network 210 to be provided as source-authenticated data 214 to a data presentation device 216 or a data consumer 218. In other examples, the signature may be provided to the distribution network 210 separately from the captured data 204 and integrated by the distribution network 210. Thus, the data is considered authentic only if the captured source bits and bytes in authentication 205 remain unaltered in source-authenticated data 214.

In yet other examples, the signature (or the authentication 205) may be provided to the distribution network in response to a trigger event to ensure storage of authenticated data by the distribution network 210. In an example scenario, a dash camera in a vehicle may record its environment and upload the recorded data to the distribution network. Most of the recorded data may not be important and deleted based on a predefined schedule. However, the recorded data may be important for legal and law enforcement purposes in case of an accident. If an accident is detected (e.g., trigger by a driver or detection of an impact by an impact sensor at the vehicle), the signature (that is source data to authenticate the captured data) may be provided to the distribution network 210 or automatically stored for future distribution and/or retrieval. That way, the portion of the recorded data related to the accident may be authenticated and stored according to the predefined schedule and subsequently used in a legal environment or by law enforcement officials.

In some example embodiments, the original captured digital data may be re-confirmed at every software or hardware transition point (e.g., between servers or software routines. In another embodiment, if data is detected as having been altered, the data may not be allowed to progress further and/or replaced with last "confirmed as authentic" data. In yet another embodiment, the data check may be performed based on a time-based parameters and/or event-based parameters.

In yet other embodiments, various error checking techniques may be employed once or multiple times on the data throughout the system. The error checking techniques may be selected based on a type of data being processed/stored/distributed or based on desired confidence levels for authenticity confirmation. For example, a simple one-dimensional parity check may be performed once in a scenario where likelihood of alteration is extremely low. On the other hand, multidimensional parity-check may be performed at multiple stages in the system when higher authenticity confidence levels are desired or opportunities for alteration of data are high (e.g., data is distributed in a file sharing network, where many people may have access to it). A multidimensional parity-check code (MDPC) is a type of error correcting code that operates by arranging data into a multidimensional grid and calculating a parity digit for each dimension. In general, an n-dimensional parity scheme can correct n/2 errors. For example, data may be arranged in a 2-dimensional table and parity bits may be computed for each row and column, then the combination of the row and column parity bits may be transmitted along with the data preventing a substitution of bit values in any given word (or row) from being undetected under single dimensional parity check.

Figure 2B:
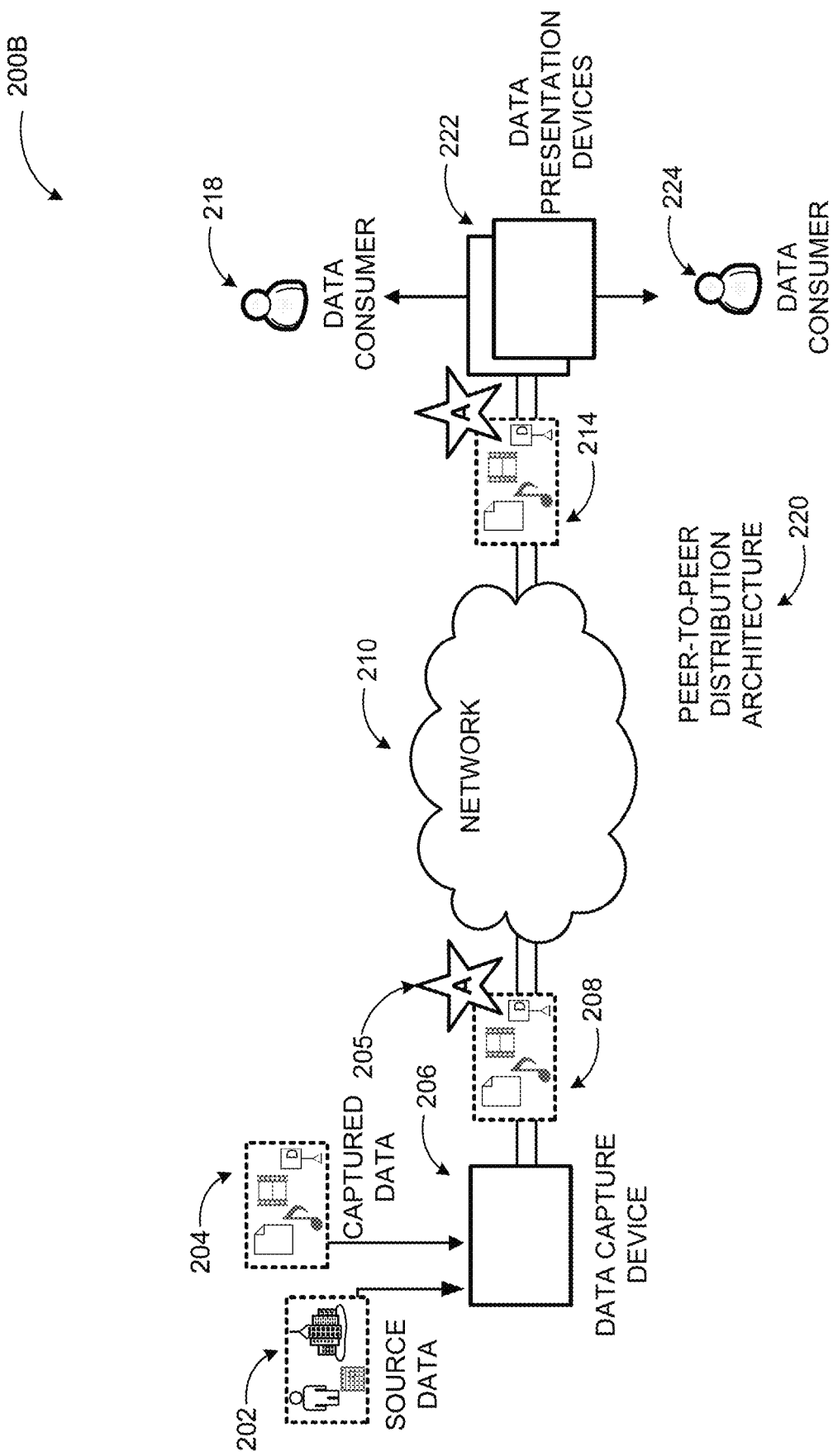
FIG. 2B depicts another example system according to some embodiments, where captured data may be provided to a data consumer via a peer-to-peer architecture with continuous authentication chain of custody.

FIG. 2B depicts another example system according to some embodiments, where captured data may be provided to a data consumer via a peer-to-peer architecture with continuous authentication chain of custody.

As shown in diagram 200B, distribution of authenticated data 208 may be through a peer-to-peer distribution architecture 220 instead of (or in addition to) a managed network architecture (e.g., server-client architecture). Thus, the source-authenticated data 214 may be provided directly from the data capture device 206 to multiple data presentation devices 222 for data consumers 218, 224, etc. The data capture device 206 may be any data capture device including, but not limited to, a sound recorder, a video recorder, an image capture device, a text capture device, a graphic capture device, a touch capture device, a computing device, a data acquisition device, or a sensor. The sensor may include a biologic sensor, a chemical sensor, a mechanical sensor, an electrical sensor, a motion sensor, or an optical sensor. The sensor may also include a health sensor, an indoor environmental sensor, an outdoor environmental sensor, a security sensor, a geologic sensor, or a safety sensor (a sensor system that is part of a control system designed to sense a state of a system and keep that state under control. In the peer-to-peer architecture, the data capture device 206 may perform some or all of the data processing such as encoding, analyzing, encrypting, filtering, compressing, de-compressing, reformatting, copying, or storing the captured data. Data may be captured and recorded as soon as possible after its capture in a state format that 'if altered, it can be detected'.

The source data 202 may also include one or more of a creator of the captured data, a person included in the captured data, a time of capture of the captured data, a date of capture of the captured data, duration of the captured date in normal or altered time, a location of capture of the captured data, a capture device, or a method of capture for the captured data. The data presentation devices 222 may include, but are not limited to, personal computing devices, stationary/mobile/wearable computing devices, smart displays, smart phones, projectors, as well as, storage servers, printers, and comparable devices.

In another example scenario, the data capture device may be a security camera at a location (e.g., a business, home, or similar). The captured video recordings may be stored locally and/or remotely. Similar to the dash camera example, most recordings may be deleted after a predefined period. In response to detecting a break-in, fire, or similar event, the security system may trigger authentication of the captured data and transmit or store the data such that it is available for subsequent analysis with authentication.

FIG. 3 depicts example major operations and components in a system with continuous authentication chain of custody for providing captured data to a data consumer in accordance with some embodiments.

Diagram 300 shows an overall view of captured data delivery with continuous authentication chain of custody.

The operations may begin with a capture device 302 and flow to a distribution network 306 with data being encoded (304) either at capture device 302 or the network 306, or both. The network 306 may be a server-managed network 312, a peer-to-peer network 314, a third-party system 316 (in collaboration with a data distribution network), or a server/client system device 318.

In a Data Alterations Detection system according to embodiments, characteristics of the digital data (bit and bytes of digitally captured data or converted from analog data) may be captured prior to encoding in a form such that any alteration may be detectable by another part of the system. For example, if a 15 sec video of a robbery is recorded on a mobile phone, the system may capture the digital bit and bytes as soon as the analog capture is converted to a digital format. That digitized data may be encoded and any subsequent alteration of '1's or '0's or "bytes" or "words" may be detectable by the system, at any point during transport or storage, by comparing the current video data against the originally captured video data, not just by visual comparison but by comparison of the video data itself. If there are any modifications to the original video data such as alteration of color, background, voice, data overlay, length of video, change of background or anything else that creates an "altered" or "fake" rendition of the original data, there will need to be a change of the bits, bytes, or sequence, etc. of their placement for this to occur. In another example, the original video data may be stored along with some additional information (for example, the number of '1's or '0's in a row, column, plane, or in a preconfigured the multi-dimensional configuration), which individually or in combination may be used to detect any alteration at any time between captured data and stored data. This additional information may be captured in a separate file (a header file) or embedded in the data set itself in a way that with a specific key the additional information may be removed automatically, rendering the original data set.

Thus, the quality and integrity of the originally captured data may be retained by capturing the digital data at the first possible moment when the captured data is transformed into a digital format (if the captured data is analog and converted to digital), and an advanced AI algorithm is used to capture unique parameters of the digital data set, for example, size, shape, bits, bytes, granularity, timing, CRC, multidimensional CRC, the number of one's and zero's in a set, or a size of strings of characters, etc. Then, different versions of the data at different points of the distribution system may be examined (e.g., by comparison of the captured unique parameters and/or the data itself) for continuous integrity (authentication). If a change is detected, the examined version of the data may be deemed as altered and non-authentic.

Upon confirmation and/or verification of authenticity and optional storage of the captured data (308), the source-authenticated data may be released to a data consumer 310 as described herein. In some cases, an opportunity to upload a video and check it against the original for authenticity may be provided. In such a case, the user may be given a metric to indicate the level of alteration, if any, for example, "the data is 99.2% accurate when compared to the original data", or the data is accurate between this time and another time. Another example may be that the video in its original form was 202 seconds while the examined (or shown) video is only 156 second. The system may determine (based on examining captured information) which parts of the 202 second video was removed and indicate that type of change to the video as well. Thus, a system according to embodiments may provide an end user valuable context by way of metric(s) to allow the user to judge for themselves an 'authenticity level' of what they are watching, hearing, or observing (other forms of captured data). In a further example, a user may wear a physiological monitor provided as part of a pre-insurance examination, for example, to track the user's heart condition for a week. The insurance company needs to be assured that the patient or the custodian of the data did not alter the data (e.g., to mask a heart problem) in order to receive insurance coverage at a discounted rate. A system according to embodiments may detect if something has been altered by comparing the original data (along with some data state vectors) against the presented data. Data sets that are unaltered may be stamped to identified as being 'authentic', 'original', or 'unaltered'. Altered data sets may be stamped as being 'modified', 'fake', or 'altered'.

In some examples, the non-encoded or encoded data may be received and stored by a third-party entity. The third-party entity may receive, confirm, verify and authenticate (308) the captured data and provide a stamp of authentication (if not done so in a previous step by the capture device 302 or the network 306). The authenticated captured data may be released to data consumers in its original form, with an indication that the data is authentic, or in a data compressed format (with appropriate markings) after a purchase transaction or value transaction is made or released at no cost. The authenticated data may be released with assurance that the captured data is unaltered or tempered with to individuals or organizations who request the authentication. Third-party entity may further store the authenticated data indefinitely or it may be deleted permanently at a certain date or time or when the completion of an event occurs (i.e., such as the completion of a medical evaluation, car rental or video recording). In some business approaches, the data may also be stored in a "short form" format (e.g., 72 hours) and then be automatically deleted allowing for reutilization of storage space in on-line storage. In some cases, the storage period may be defined based on the authentication signature. For example, if the source data used to authenticate the captured data is date/time of capture, the storage period may be a predefined period (e.g., 1 hour, 24 hours, 1 month, etc.) from the capture date/time.

In other examples, a peer-to-peer network used for distribution of the captured data may be a blockchain or other application driven solution that with a similar intent. In one example process, the data may be received by the nodes in a blockchain where the data may be converted using a cryptographic hash function to a new encoded hash value. This cryptographic hash value may be the same at all nodes in order for consensus to be reached. If the data is altered or tampered with in any way (at any node), a new hash value may be achieved after it is converted by the hash function. Each block in the blockchain may comprise a header and the set of transactions that was completed with the data. The header may include, for example, one or more of the creator of the data, a unique identifying code the machine or device the data was recorded on, owner of the data, a digital signature of the owner, where it was created, a time stamp for when the data was created and received by network 306, length of the data, sampling rate resolution, the hash value, the miner who created the block, the reward and the total transaction fees, and the chain of passage of the data set from one unique system (hardware and/or software) to the next, etc. The hashed data may be stored indefinitely or for a predefined time period in conjunction with the original data set or separately on separate servers to enhance overall security of the data. The hashed data may be released to a data consumer or organization when requested for free or for a transaction fee.

In further examples, each component of system according to embodiments may be configured to re-authenticate the captured data and also identify how, when, where, and if the data was compromised or altered without authorization. Throughout the operations in diagram 300, the captured data may be examined continuously or at multiple stages for data integrity during transportation/transitioning from capture to storage and to release to data consumer. The data may also be monitored periodically based on a user defined interval or event driven point such as movement of the data from one server to the next or from one software function to the next. The system may detect any tampering or alterations of the captured data (hashtag or CRC check or other mechanism) and further identify what time and date (such as in the case of video) the original data that was altered. The system may use one, some, or any combination (in any sequence of assessment) of indicators to determine if the date has been tampered with. If the captured data is detected to have been altered in any manner, the system may notify a data consumer in a number of different methods. Such notification methods may include marking of the data, text, email, phone call, post, or a combination thereof. In another example, if an organization has a copy of an authentic video and discovers that a close (but not authentic) version of the same video is being broadcast, the organization may take steps as a social service to alert viewers of the altered nature of the broadcast video.

In yet other examples, a third party who has what they believe to be an authentic, unaltered copy of the captured data, may ask that their data be authenticated, as part of commercial transaction, by comparing it to a previously verified and authentic data set. A system according to embodiments may be used such that the original captured data may remain unaltered from its original form as it passes through physical components such as a capture device, hardware (application-specific integrated circuit (ASIC), microprocessor, etc.), encryption, servers, software, applications, transport layers, etc. through to storage in any of its various configurations within each process step.

Figure 4:
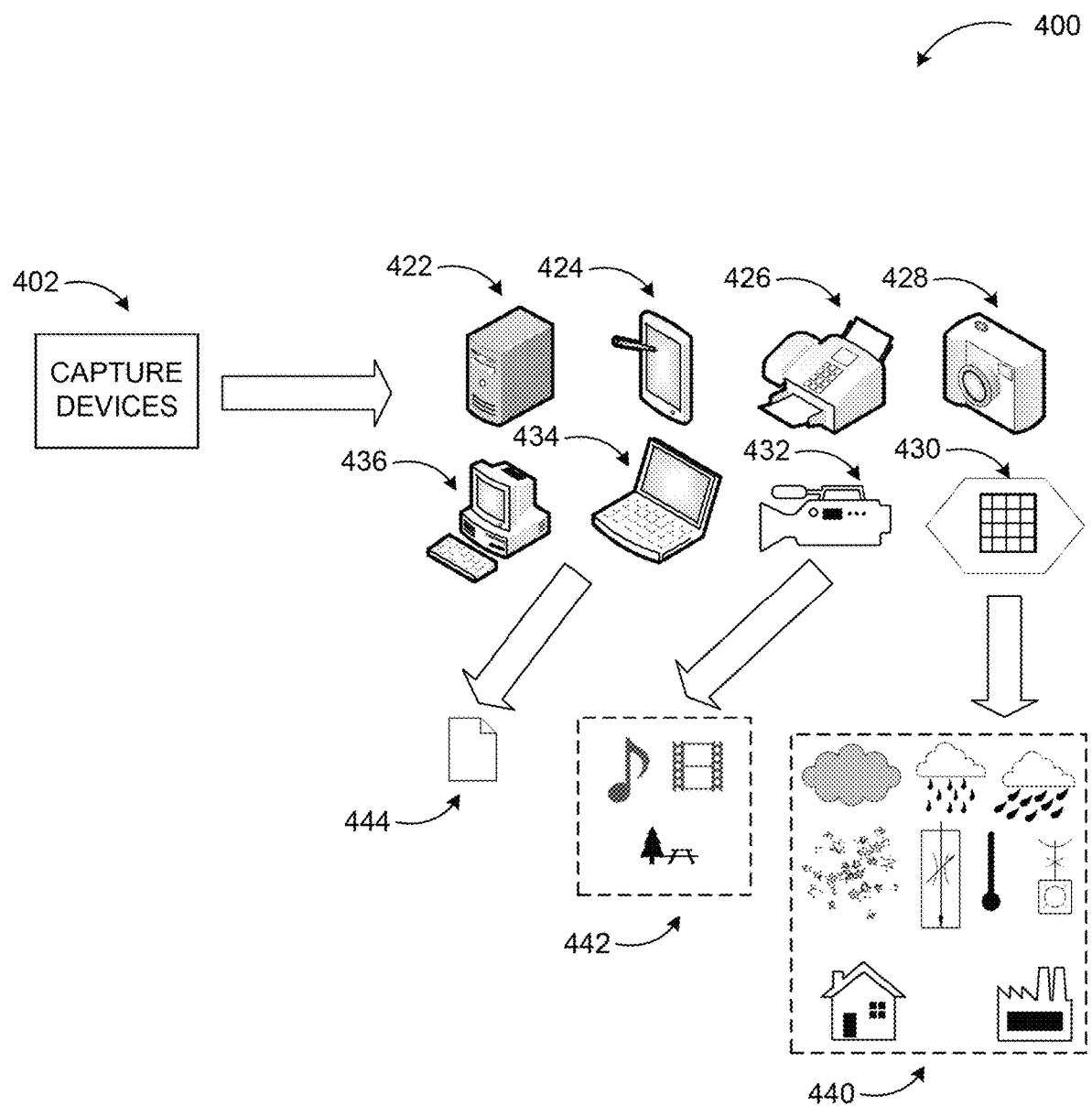
FIG. 4 depicts example data capture devices and environments in accordance with some embodiments.

FIG. 4 depicts example data capture devices and environments in accordance with some embodiments.

Diagram 400 shows examples of data capture devices 402, which may include a server 422, a handheld computer (e.g., tablet) 424, a document capture device 426 such as a scanner or fax machine, a digital camera 428 (e.g., a still picture camera or a motion picture camera), a desktop computer 436, a laptop computer 434, a video recorder 432, or a sensor 430. Some of the data capture devices such as the desktop computer 436, server 422, or laptop computer 434 may capture data in form of documents 444 (any form of textual and/or graphic content), while other capture devices such as video recorder 432 may capture audio and/or video data 442. The sensor 430 may include one of a large number of sensors deployed in a variety of environments (440) such as a biologic sensor, a chemical sensor, a mechanical sensor, an electrical sensor, or an optical sensor. The sensors may be deployed in a health care environment, as part of an environmental detection/measurement system (an indoor environmental sensor, an outdoor environmental sensor), a security environment, or a geologic detection environment, for example.

The data capture devices 402 may perform some or all of the data processing such as encoding, analyzing, encrypting, filtering, compressing, de-compressing, reformatting, copying, or storing the captured data.

Figure 5:
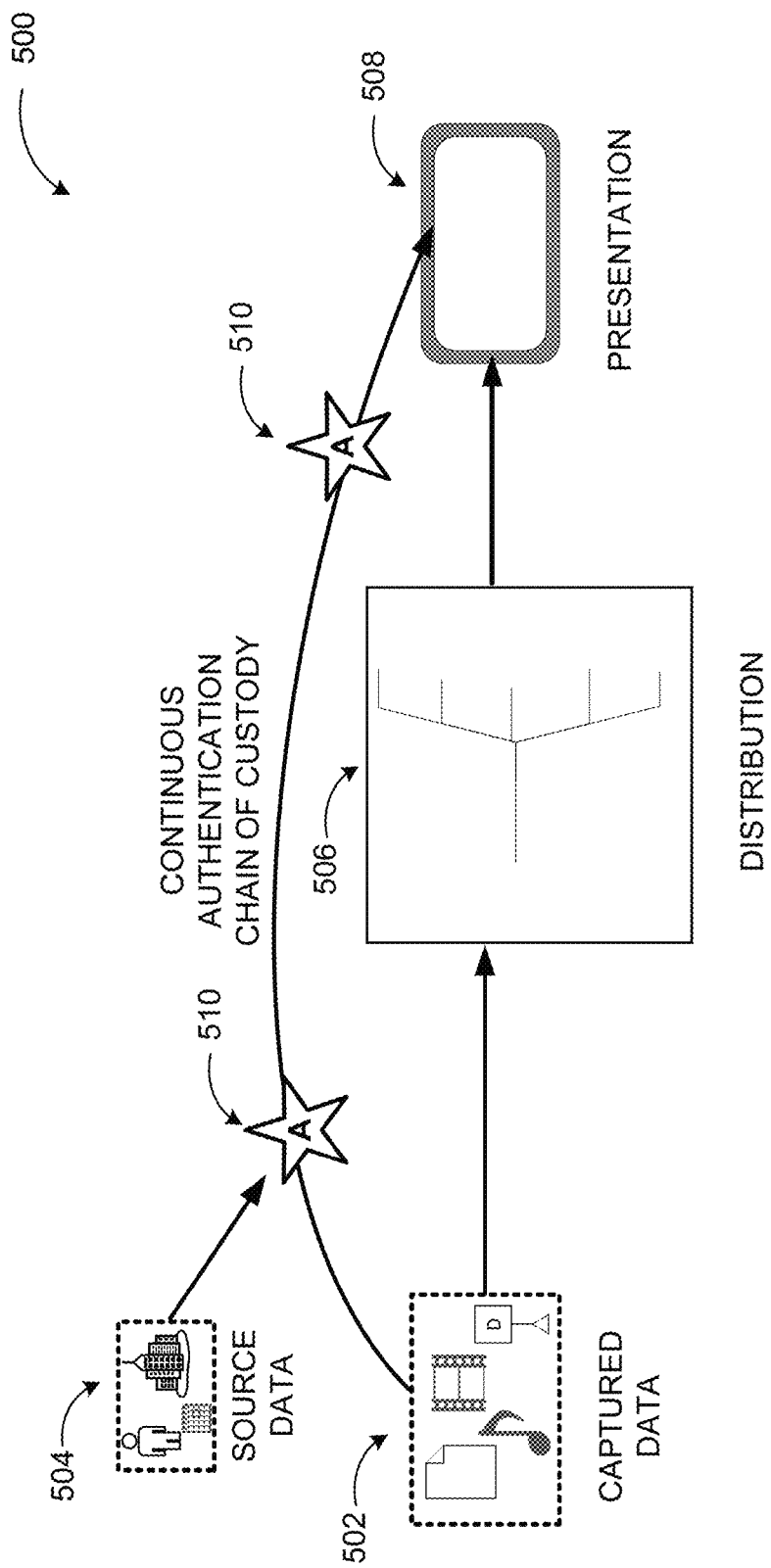
FIG. 5 depicts a conceptual overview of continuous authentication chain of custody for providing captured data to a data consumer in accordance with some embodiments.

FIG. 5 depicts a conceptual overview of continuous authentication chain of custody for providing captured data to a data consumer in accordance with some embodiments.

As discussed above, digital data and its unique characteristics may be captured at the earliest possible time point upon capture of the original data or digitization of analog data. The data itself and/or the captured characteristics may then be used throughout a distribution system up to presentation to a consumer of the data to examine and confirm/reconfirm the authenticity of the data. This way, an example system may indicate to the consumer of the data whether or not the presented data is authentic, if not authentic how/when/where it was altered, which parts were altered, and other contextual information. The system may also be enabled to replace altered portions upon detection, remove altered data from distribution, or perform similar mitigation actions. Diagram 500 shows how captured data 502 may be authenticated with received or captured source data 504 and the authentication 510 may be preserved throughout distribution 506 of the captured data 502 to presentation 508 to a consumer of data.

In some examples, the authenticated data may be monitored or re-verified on a regular (synchronous user defined timeframe) or irregular, but, pre-determined basis (asynchronous timeframe or event driven). The data integrity may be re-verified via a periodic or event-based data integrity check. This may be carried out, for example, by a system developed by a third-party organization, peer-to-peer network, or other method including automated artificial intelligence (AI) algorithms, or deep learning (DL) algorithms. The authenticity check may also be performed by a separate data integrity server. From the point the captured data is observed and first collected to the point it is stored and made available to a data consumer, elements (e.g., physical, hardware (HW), firmware, software (SW), application and other components of the system) are configured and positioned to ensure data integrity is maintained (chain of custody preserved and where necessary, a chain of unbroken authentication) collectively and individually. Any unauthorized tampering of the data is detectable and reportable as necessary to the data consumer or a secondary application.

In other examples, once the captured data is stored and certified as being authentic by system, the data may be used as a master recording to certify other copies as being authentic. For example, an original recording of witness testimony or an original amateur recording of video of a famous performer may be used to authenticate further copies. The system may be able to confirm if the integrity of the original recording was maintained during remastering process (for example, the extent of auto-tuning a voice recording). In another example, a law enforcement official's body-cam recording may be tampered with by splicing in new video or some part of the original video may be removed without authorization. By maintaining chain of custody of authentication throughout the distribution, the system may be able to identify and indicate the tampering. Other aspects may be combined with authenticity to provide context. For example, knowing that an entire video recording is known to be 90 seconds long, yet what is shown is only 15 seconds long may mean that the conclusion was not presented and the video, albeit unaltered in content of what was shown, may be presented out of context. So, knowing the total length of recording and what portion of the video was shown (start point and end point) of the total time may be of value in certain circumstances.

A system according to embodiments may be configured to synchronize multiple independent data streams and data types, for example, a video of someone running and their corresponding physiological data, which may also include environmental data (e.g., pollen count). A computer or AI algorithm may be used to automatically make a prediction on the authenticity of the combined or derived data. The system may be further configured to form a secondary authenticated data type comprising a combination of multiple independent data types. In some examples, the system may be configured to control the number of authentic copies that may be released for general distribution by uniquely identifying each copy or by uniquely embedding a uniquely detectable identifier in the data or in an associated file such as a header file.

Different implementation models may be employed according to some embodiments. In some examples, a capture device may provide the end-to-end authentication in a peer-to-peer distribution. A distribution system managing some or all of the components of the distribution network may also manage the continuous chain of custody of authentication. In yet other examples, a third-party service may manage some of the interactions and the authentication and control transactions that may include pricing based on one or more of the amount of time the data is stored and available to certified authentic retrieval, the resolution or granularity the data is stored at, the number times the stored data is accessed by a data consumer and when and who accesses the stored data (i.e., court, media, news organization, etc.), how long data is stored in a server, or even a subscription model for business.

Distribution systems may include private or public systems such as social networks, professional networks, image/video/other data sharing services, media distribution services, and similar ones. Examples of authenticated data may include a wide range of data such as textual or graphic documents, audio media, video media, sensed data, but also specific forms of data such as physician's instructions to patients or pharmacists, school correspondence to parents, legal documents, and any other data that may need to be authenticated. In another example, a government, a corporation, and the like may set a policy that an independent third party authenticate a data set as being 'unaltered' before they choose to depend on the data or use the data.

Figure 6:
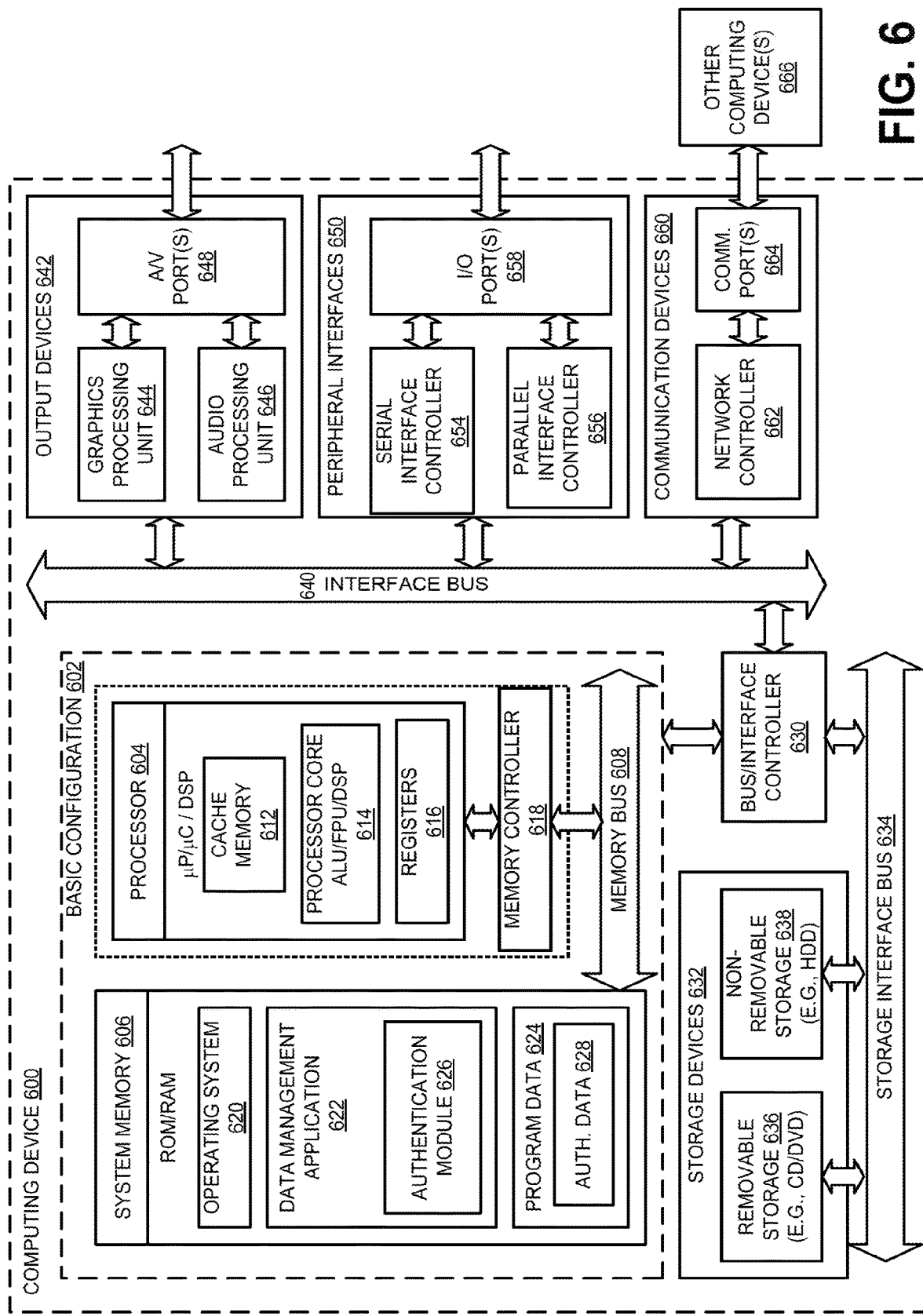
FIG. 6 depicts an example computing device, which may be used to manage continuous authentication chain of custody for providing captured data to a data consumer in accordance with some embodiments.

FIG. 6 depicts an example computing device, which may be used to manage continuous authentication chain of custody for providing captured data to a data consumer in accordance with some embodiments.

In an example basic configuration 602, the computing device 600 may include one or more processors 604 and a system memory 606. A memory bus 608 may be used to communicate between the processor 604 and the system memory 606. The basic configuration 602 is illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof (e.g., a graphics processing unit (GPU) working alone or in combination with other processors or GPUs). The processor 604 may include one or more levels of caching, such as a cache memory 612, a processor core 614, and registers 616. The example processor core 614 may include an arithmetic logic unit (ALU), a floating-point unit (FPU), a digital signal processing core (DSP core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as random access memory (RAM)), non-volatile memory (such as read-only memory (ROM), flash memory, optical memory, etc.) or any combination thereof. The system memory 606 may include an operating system 620, a data management application 622, and program data 624. The data management application 622 may include an authentication module 626. The authentication module 626, in conjunction with the data management application 622 may be configured to perform tasks associated with capture and presentation of authenticated data through continuous chain of custody. The program data 624 may include authentication data 628, among other data, as described herein. Various functionality such as encryption, encoding, authentication, examination/re-examination of authenticated data may be performed by one or more components of the computing device 600, individually or in combination, such as various processors, controllers, software stored on various data storage components (and executed by the processor(s), etc.).

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disc (CD) drives or digital versatile disk (DVD) drives, solid state drives (SSDs), and tape drives to name a few. Example computer storage media may include volatile and nonvolatile, removable and non-removable media implemented on location or remotely (in the cloud) in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, electrically erasable programmable read-only memory (EEPROM), flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., one or more output devices 642, one or more peripheral interfaces 650, and one or more communication devices 660) to the basic configuration 602 via the bus/interface controller 630. Some of the example output devices 642 include a graphics processing unit 644 and an audio processing unit 646, which may be configured to communicate to various external devices such as a display or speakers via one or more audio/video (A/V) ports 648. One or more example peripheral interfaces 650 may include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more input/output (I/O) ports 658. An example communication device 660 includes a network controller 662, which may be arranged to facilitate communications with one or more other computing devices 666 over a network communication link via one or more communication ports 664. The one or more other computing devices 666 may include servers at a datacenter, customer equipment, and comparable devices. Input, output, and communication devices may be used to exchange the captured data, source information, configuration information, and any other data associated with providing continuous authentication with other hardware and software components of a system according to embodiments such as an integrity server, a consumer device, a database, other data stores, etc.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media (e.g., terrestrial based or satellite based). The term computer readable media as used herein may include non-transitory storage media.

The computing device 600 may be implemented as a part of a specialized server, mainframe, or similar computer that includes any of the above functions or distributed or cloud-based system. The computing device 600 may also be implemented as a personal computer including both laptop computer and non-laptop computer configurations.

Figure 7:
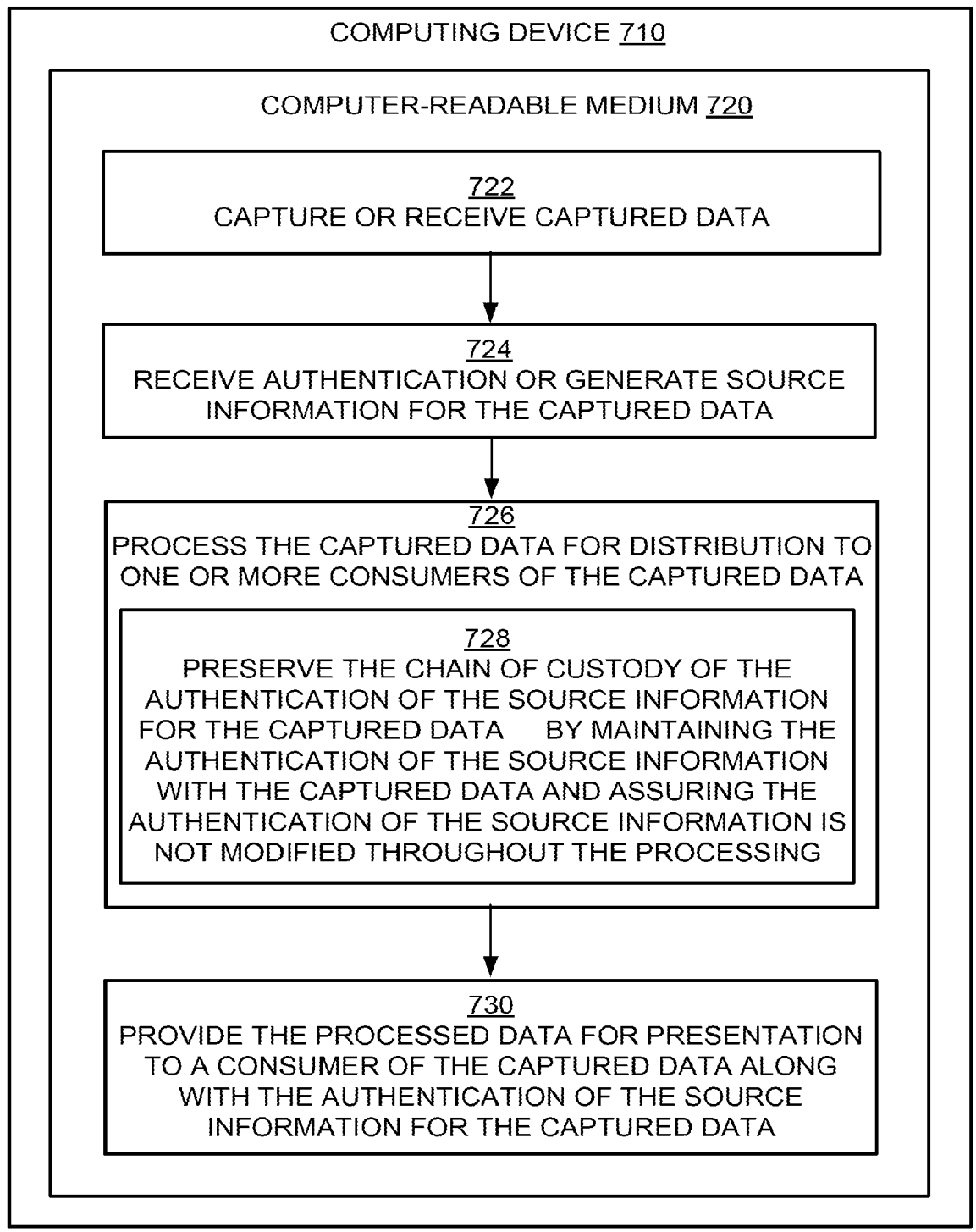
FIG. 7 depicts a flow diagram of an illustrative process for providing captured data to a data consumer with continuous authentication chain of custody in accordance with some embodiments.

FIG. 7 depicts a flow diagram of an illustrative process for providing captured data to a data consumer with continuous authentication chain of custody in accordance with some embodiments.

Example methods of definitively securing digital or analog data in a form that if altered in anyway such alteration would be detectable may include one or more operations, functions, or actions as illustrated by one or more of blocks 722, 724, 726, 728, and 730 may in some embodiments be performed by a computing device such as the computing device 710 in FIG. 7. Such operations, functions, or actions in FIG. 7 and in the other figures, in some embodiments, may be combined, sequence many be changed, eliminated, modified, and/or supplemented with other operations, functions or actions, and need not necessarily be performed in the exact sequence as shown. The operations described in the blocks 722-730 may be implemented through execution of computer-executable instructions stored in a computer-readable medium such as a computer-readable medium 720 of a computing device 710.

An example process for capture and presentation of authenticated data through continuous chain of custody may begin with block 722, "CAPTURE OR RECEIVE CAPTURED DATA", where audio data, video data, textual data, graphic data, sensor data or a combination thereof may be captured or received by a data capture device such as a sound recorder, a video recorder, an image capture device, a text capture device, a graphic capture device, a touch capture device, a computing device, a data acquisition device, or a sensor.

Block 722 may be followed by block 724, "RECEIVE AUTHENTICATION OR GENERATE SOURCE INFORMATION FOR THE CAPTURED DATA", where source information such as a creator of the captured data, a person included in the captured data, a time of capture of the captured data, a date of capture of the captured data, a location of capture of the captured data, a capture device, a method of capture for the captured data, or similar data may be captured or received by the capture device or another device to assist in the authentication of the captured data.

Block 724 may be followed by block 726, "PROCESS THE CAPTURED DATA FOR DISTRIBUTION TO ONE OR MORE CONSUMERS OF THE CAPTURED DATA", where the captured data may be processed distribution or storage by being encoded, analyzed, encrypted, filtered, compressed, de-compressed, reformatted, copied, or stored.

Block 726 may be followed by or include block 728, "PRESERVE THE CHAIN OF CUSTODY OF THE AUTHENTICATION OF THE SOURCE INFORMATION FOR THE CAPTURED DATA BY MAINTAINING THE AUTHENTICATION OF THE SOURCE INFORMATION WITH THE CAPTURED DATA AND ASSURING THE AUTHENTICATION OF THE SOURCE INFORMATION IS NOT MODIFIED THROUGHOUT THE PROCESSING", where authentication of the captured data with the source information may be preserved throughout the distribution process/system. In some cases, each hardware or software component of the system may examine the data and re-authenticate by comparing the original data or data signatures with that of the final stage of data or data signatures. In other cases, the (comparison-based) confirmation of authentication may be performed at various stages of the distribution/storage system. The data may also be authenticated or reauthenticated (to ensure the chain of custody) by an AI algorithm stored elsewhere on another computing device or the same computing device (or a combination). In some cases, a secondary authentication may also be performed with local software or hardware. In other examples, the components of the system may be certified to preserve authentication (not allow alteration in any form).

Block 728 may be followed by block 730, "PROVIDE THE PROCESSED DATA FOR PRESENTATION TO A CONSUMER OF THE CAPTURED DATA ALONG WITH THE AUTHENTICATION OF THE SOURCE INFORMATION FOR THE CAPTURED DATA", where a presentation device such as a personal computing device, a stationary/mobile/wearable computing device, a smart display, a smart phone, a projector, as well as, a storage server, a printer, and a comparable device may provide the data to a data consumer. The presented data may be marked with an indication of its authenticity in some examples. The authentic data may be combined with other more subjective data, for example, facial recognition or a physiologic signature from a separate database of data or a separate source of data to provide a combined authenticity with a confidence level (confidence of a personal identity or signature). For example, an indication such as "There is a 99.4% confidence that the data is authentic" may be displayed along with the data. The confidence level may be displayed to the consumer of the data (or made available to AI algorithm) so that they may be able to make independent educated judgement as to combined authenticity.

The operations included in the process described above are for illustration purposes. Capture and presentation of authenticated data through continuous chain of custody may be implemented by similar processes with fewer or additional operations, as well as in different order of operations using the principles described herein. The operations described herein may be executed by one or more processors operated on one or more computing devices, one or more processor cores, and/or specialized processing devices, among other examples. The operations described herein may also be executed by hardware and/or software implemented processors co-located on a single device, distributed across multiple devices at a single location or distributed over a cloud-based implementation. Serial or parallel processing may be used along with employment of various AI and other machine learning algorithms.

In some embodiments, the captured data and the authentication information may be stored together, embedded within each other in a way that they be separated using a secrete key or secrete algorithm, or may be stored separately on different devices or computes for security purposes.

FIG. 8 illustrates and example computer program product to provide computer-executable instructions for providing captured data to a data consumer with continuous authentication chain of custody in accordance with some embodiments.

In some examples, as shown in FIG. 8, a computer program product 800 may include a signal bearing medium 802 that may also include one or more machine readable instructions 804 that, in response to execution by, for example, a processor may provide the functionality described herein. Thus, for example, referring to the processor 604 in FIG. 6, the data management application 622 may perform or control performance of one or more of the tasks shown in FIG. 8 in response to the instructions 804 conveyed to the processor 604 by the signal bearing medium 802 to perform actions associated with capture and presentation of authenticated data through continuous chain of custody described herein. Some of those instructions may include, for example, receiving the captured data; receiving authentication of source information for the captured data; processing the captured data for distribution to one or more consumers of the captured data, while preserving the chain of custody of the authentication of the source information for the captured data by maintaining the authentication of the source information with the captured data and assuring the authentication of the source information is not modified throughout the processing; and providing the processed data for presentation to a consumer of the captured data along with the authentication of the source information for the captured data, according to some embodiments described herein.

In some implementations, the signal bearing medium 802 depicted in FIG. 8 may encompass computer-readable medium 806, such as, but not limited to, a hard disk drive (HDD), a solid state drive (SSD), a compact disc (CD), a digital versatile disk (DVD), a digital tape, memory, and comparable non-transitory computer-readable storage media. In some implementations, the signal bearing medium 802 may encompass recordable medium 808, such as, but not limited to, memory, read/write (R/W) CDs, R/W DVDs, etc. In some implementations, the signal bearing medium 802 may encompass communications medium 810, such as, but not limited to, a digital and/or an analog communication medium (e.g., a fiber optic cable, a waveguide, a wired communication link, a wireless communication link, etc.). Thus, for example, the computer program product 800 may be conveyed to one or more modules of the processor 604 by an RF signal bearing medium, where the signal bearing medium 802 is conveyed by the communications medium 810 (e.g., a wireless communications medium conforming with the Institute of Electrical and Electronics Engineers (IEEE) 802.11 standard).

According to some examples, a method to provide captured data with continuous authentication chain of custody is described. The method may include receiving the captured data; upon conversion of the captured data to a digital format, capturing one or more characteristics of the captured data in the digital format; receiving source information for the captured data; while the captured data is in a system for one or more of distribution, processing, or storage, examining an authenticity of the captured data one or more times using one or more of the captured data in the digital format, the one or more captured characteristics of the captured data in the digital format, and the source information for the captured data; generating authentication information for the captured data based on the examining; and making the captured data available along with the authentication information, wherein the captured data made available is declared as being original or authentic based on the authentication information.

According to other examples, receiving the captured data may include receiving analog data or capturing digital data. Capturing the one or more characteristics of the captured data in the digital format may include capturing one or more of a size, a shape, a number of bits, a number of bytes, a granularity, a timing, a cyclical redundancy check (CRC), a multi-dimensional CRC, a number of '1's and '0's, or a size of strings of characters of at least a portion of the captured data in the digital format. The method may further include one of embedding the authentication information into the captured data in the digital format or storing the authentication information in a separate file. The source information may include one or more of an identity of a person associated with the captured data, an identity of a location associated with the captured data, a time stamp, a geo-location stamp, a length of the captured data, a portion of the captured data, a creator of the captured data, a person included in the captured data, a time of capture of the captured data, a date of capture of the captured data, a capture device, a method of capture for the captured data, or a combination thereof.

According to further examples, examining the authenticity of the captured data one or more times may include comparing a current version and a previous version of the one or more of the captured data in the digital format, the one or more captured characteristics of the captured data in the digital format, the source information for the captured data, or a combination thereof. Examining the authenticity of the captured data one or more times may also include examining the authenticity of the captured data at one or more hardware or software components of the system; examining the authenticity of the captured data as the captured data in the digital format is transitioned between one or more hardware or software components of the system; or examining the authenticity of the captured data based on a system or user defined time period. A number of examinations of the authenticity of the captured data may be determined based on a type of the captured data or a desired level of confidence.

According to yet other examples, generating the authentication information for the captured data may include generating one or more of an indication of the authenticity of the provided captured data, context information, and alteration information if the captured data is determined to be altered. Generating the indication of the authenticity of the provided captured data may include generating one or more of a numerical indication, a textual indication, a graphic indication, or a combination thereof associated with the authenticity of the provided captured data. Generating the context information may include generating a comparison of the source information with a corresponding characteristic of the provided captured data. Generating the alteration information may include generating an indication of when, how, where, which portion, or by whom, the captured data was altered. Providing the captured data along with the authentication information may include providing the captured data along with the authentication information to one or more of: a computing device associated with a consumer of the captured data, a server for analysis, storage, or distribution, or an artificial intelligence (AI) module for analysis.

According to some examples, the method may also include generating a signature based on the authentication information; and signing the captured data in the digital format with the signature, wherein the signature comprises a cryptographic hash function, an overlay, a logo, a marker detectable by human senses, a marker not detectable by human senses, or a combination thereof. The method may further include storing the signature separately from the captured data in the digital format or storing the signature in a distributed fashion while making the captured data available. A number and a schedule of examinations of the authenticity of the captured data may be determined based on a trigger event. The trigger event may include one or more of receiving confirmation of purchase or lease of the captured data from the consumer of the captured data, receiving a law enforcement request, receiving a legal request, receiving an instruction from a creator of the captured data, receiving an instruction from a consumer of the captured data, or receiving an instruction from a third-party entity. The method may further include determining a retention schedule for storing the captured data based on the authentication information. The captured data may include one or more of audio data, video data, textual data, graphic data, sensor data, or a combination thereof. The captured data may be acquired by one or more of a sound recorder, a video recorder, an image capture device, a text capture device, a graphic capture device, a touch capture device, a computing device, a data acquisition device, or a sensor. The sensor may include a biologic sensor, a chemical sensor, a mechanical sensor, an electrical sensor, an optical sensor, an electromagnetic sensor, a physiological sensor, a motion sensor, a health sensor, an indoor environmental sensor, an outdoor environmental sensor, a security sensor, a geologic sensor, and a state sensor. The provided captured data may be in form of a single file, a distributed file system, a data blob, or a data stream. The system may be configured as a managed network or a peer-to-peer network.

According to other examples, a system to provide captured data with continuous authentication chain of custody is described. The system may include a first computing device configured to receive the captured data; a second computing device, configured to upon converting the captured data to a digital format, capture one or more characteristics of the captured data in the digital format; receive source information for the captured data; examine an authenticity of the captured data one or more times using one or more of the captured data in the digital format, the one or more captured characteristics of the captured data in the digital format, and the source information for the captured data; and generate authentication information for the captured data based on the examining; and a third computing device, configured to receive the captured data and the authentication information from the second computing device; and make the captured data available along with the authentication information, wherein the captured data made available is declared as being original or authentic based on the authentication information.

According to further examples, the first computing device may be configured to receive analog data or capture digital data. The one or more characteristics of the captured data in the digital format may include one or more of a size, a shape, a number of bits, a number of bytes, a granularity, a timing, a cyclical redundancy check (CRC), a multi-dimensional CRC, a number of '1's and '0's, or a size of strings of characters of at least a portion of the captured data in the digital format. The second computing device may be configured to one of embed the authentication information into the captured data in the digital format or store the authentication information in a separate file. The source information may include one or more of an identity of a person associated with the captured data, an identity of a location associated with the captured data, a time stamp, a geo-location stamp, a length of the captured data, a portion of the captured data, a creator of the captured data, a person included in the captured data, a time of capture of the captured data, a date of capture of the captured data, a capture device, a method of capture for the captured data, or a combination thereof. The second computing device may be configured to examine the authenticity of the captured data one or more times by comparing a current version and a previous version of the one or more of the captured data in the digital format, the one or more captured characteristics of the captured data in the digital format, the source information for the captured data, or a combination thereof.

According to yet other examples, the second computing device may be configured to examine the authenticity of the captured data one or more times by examining the authenticity of the captured data at one or more hardware or software components of the system; examining the authenticity of the captured data as the captured data in the digital format is transitioned between one or more hardware or software components of the system; or examining the authenticity of the captured data based on a system or user defined time period. A number of examinations of the authenticity of the captured data may be determined based on a type of the captured data or a desired level of confidence. The second computing device may be configured to generate the authentication information for the captured data by generating one or more of an indication of the authenticity of the provided captured data, context information, and alteration information if the captured data is determined to be altered. The second computing device may be configured to generate the indication of the authenticity of the provided captured data by generating one or more of a numerical indication, a textual indication, a graphic indication, or a combination thereof associated with the authenticity of the provided captured data. The second computing device may be configured to generate the context information by generating a comparison of the source information with a corresponding characteristic of the provided captured data. The second computing device may be configured to generate the alteration information by generating an indication of when, how, where, which portion, or by whom, the captured data was altered.

According to some examples, the third computing device may be configured to make the captured data available along with the authentication information by providing the captured data along with the authentication information to one or more of a computing device associated with a consumer of the captured data, a server for analysis, storage, or distribution, or an artificial intelligence (AI) module for analysis. The second computing device may be further configured to generate a signature based on the authentication information; and sign the captured data in the digital format with the signature, wherein the signature comprises a cryptographic hash function, an overlay, a logo, a marker detectable by human senses, a marker not detectable by human senses, or a combination thereof. The second computing device may be further configured to store the signature separately from the captured data in the digital format or store the signature in a distributed fashion while making the captured data available. A number and a schedule of examinations of the authenticity of the captured data may be determined based on a trigger event. The trigger event may include one or more of receiving confirmation of purchase or lease of the captured data from the consumer of the captured data, receiving a law enforcement request, receiving a legal request, receiving an instruction from a creator of the captured data, receiving an instruction from a consumer of the captured data, or receiving an instruction from a third-party entity.

According to other examples, the second computing device may be further configured to determine a retention schedule for storing the captured data based on the authentication information. The captured data may include one or more of audio data, video data, textual data, graphic data, sensor data, or a combination thereof. The captured data may be acquired by one or more of a sound recorder, a video recorder, an image capture device, a text capture device, a graphic capture device, a touch capture device, a computing device, a data acquisition device, or a sensor. The sensor may include a biologic sensor, a chemical sensor, a mechanical sensor, an electrical sensor, an optical sensor, an electromagnetic sensor, a physiological sensor, a motion sensor, a health sensor, an indoor environmental sensor, an outdoor environmental sensor, a security sensor, a geologic sensor, and a state sensor. The captured data may be made available in form of a single file, a distributed file system, a data blob, or a data stream. The system may be configured as a managed network or a peer-to-peer network. The second computing device may be further configured to one or more of analyze, encrypt, filter, compress, de-compress, reformat, copy, or store the captured data. One or more of the first computing device, the second computing device, and the third computing device may be integrated as a single computing device.

According to further examples, a data capture device to provide captured data with continuous authentication chain of custody is described. The data capture device may include a communication device configured to facilitate communications with one or more computing devices; a memory; and a processor coupled to the communication device and the memory. The processor, in conjunction with instructions stored in the memory, may be configured to capture the data; upon conversion of the captured data to a digital format, capture one or more characteristics of the captured data in the digital format; receive or capture source information for the captured data; generate authentication information for the captured data based on the one or more captured characteristics of the captured data in the digital format and the source information for the captured data; and make the captured data available along with the authentication information such that, while the captured data is in a system for one or more of distribution, processing, or storage, an authenticity of the captured data is analyzable one or more times using one or more of the captured data in the digital format, the one or more captured characteristics of the captured data in the digital format, and the source information for the captured data.

According to yet other examples, the one or more characteristics of the captured data in the digital format may include one or more of a size, a shape, a number of bits, a number of bytes, a granularity, a timing, a cyclical redundancy check (CRC), a multi-dimensional CRC, a number of '1's and '0's, or a size of strings of characters of at least a portion of the captured data in the digital format. The processor may be configured to one of embed the authentication information into the captured data in the digital format or store the authentication information in a separate file. The source information may include one or more of an identity of a person associated with the captured data, an identity of a location associated with the captured data, a time stamp, a geo-location stamp, a length of the captured data, a portion of the captured data, a creator of the captured data, a person included in the captured data, a time of capture of the captured data, a date of capture of the captured data, a capture device, a method of capture for the captured data, or a combination thereof. The processor may be configured to generate the authentication information for the captured data by generating one or more of an indication of the authenticity of the provided captured data and context information. The processor may be configured to generate the indication of the authenticity of the provided captured data by generating one or more of a numerical indication, a textual indication, a graphic indication, or a combination thereof associated with the authenticity of the provided captured data. The processor may be configured to generate the context information by generating a comparison of the source information with a corresponding characteristic of the provided captured data.

According to some examples, the processor may be configured to make the captured data available along with the authentication information by providing the captured data along with the authentication information to one or more of a computing device associated with a consumer of the captured data, a server for analysis, storage, or distribution, or an artificial intelligence (AI) module for analysis. The processor may be further configured to generate a signature based on the authentication information; and sign the captured data in the digital format with the signature, wherein the signature comprises a cryptographic hash function, an overlay, a logo, a marker detectable by human senses, a marker not detectable by human senses, or a combination thereof. The processor may be further configured to store the signature separately from the captured data in the digital format or store the signature in a distributed fashion while making the captured data available. The captured data may include one or more of audio data, video data, textual data, graphic data, sensor data, or a combination thereof. The captured data may be acquired by one or more of a sound recorder, a video recorder, an image capture device, a text capture device, a graphic capture device, a touch capture device, a computing device, a data acquisition device, or a sensor. The sensor may include a biologic sensor, a chemical sensor, a mechanical sensor, an electrical sensor, an optical sensor, an electromagnetic sensor, a physiological sensor, a motion sensor, a health sensor, an indoor environmental sensor, an outdoor environmental sensor, a security sensor, a geologic sensor, and a state sensor. The captured data may be made available in form of a single file, a distributed file system, a data blob, or a data stream.

According to other examples, a system to provide captured data with continuous authentication chain of custody is described. The system may include a data capture device configured to capture one or more of the data and the authentication data; and upon detecting a trigger event, provide the captured data to a server; and the server communicatively coupled to the data capture device, the server configured to upon converting the captured data to a digital format, capture one or more characteristics of the captured data in the digital format; receive source information for the captured data; examine an authenticity of the captured data one or more times using one or more of the captured data in the digital format, the one or more captured characteristics of the captured data in the digital format, and the source information for the captured data; and generate authentication information for the captured data based on the examining; and make the captured data available along with the authentication information, wherein the captured data made available is declared as being original or authentic based on the authentication information.

According to further examples, the one or more characteristics of the captured data in the digital format may include one or more of a size, a shape, a number of bits, a number of bytes, a granularity, a timing, a cyclical redundancy check (CRC), a multi-dimensional CRC, a number of '1's and '0's, or a size of strings of characters of at least a portion of the captured data in the digital format. The data capture device may be one or more of a sound recorder, a video recorder, an image capture device, a text capture device, a graphic capture device, a touch capture device, a computing device, a data acquisition device, or a sensor. The data capture device may be in a mobile environment. The sensor may include a biologic sensor, a chemical sensor, a mechanical sensor, an electrical sensor, an optical sensor, an electromagnetic sensor, a physiological sensor, a motion sensor, a health sensor, an indoor environmental sensor, an outdoor environmental sensor, a security sensor, a geologic sensor, and a state sensor. The trigger event may include one or more of receiving confirmation of purchase or lease of the captured data from the consumer of the captured data, receiving a law enforcement request, receiving a legal request, receiving an instruction from a creator of the captured data, receiving an instruction from a consumer of the captured data, receiving an instruction from a third-party entity, an accident, a break-in, or a motion in a monitored area.

According to yet other examples, the source information may include one or more of an identity of a person associated with the captured data, an identity of a location associated with the captured data, a time stamp, a geo-location stamp, a length of the captured data, a portion of the captured data, a creator of the captured data, a person included in the captured data, a time of capture of the captured data, a date of capture of the captured data, a capture device, a method of capture for the captured data, or a combination thereof. The server may be configured to examine the authenticity of the captured data one or more times by comparing a current version and a previous version of the one or more of the captured data in the digital format, the one or more captured characteristics of the captured data in the digital format, the source information for the captured data, or a combination thereof. The server may be configured to examine the authenticity of the captured data one or more times by examining the authenticity of the captured data at one or more hardware or software components of the system; examining the authenticity of the captured data as the captured data in the digital format is transitioned between one or more hardware or software components of the system; or examining the authenticity of the captured data based on a system or user defined time period. A number of examinations of the authenticity of the captured data may be determined based on a type of the captured data or a desired level of confidence.

According to some examples, the server may be configured to generate the authentication information for the captured data by generating one or more of an indication of the authenticity of the provided captured data, context information, and alteration information if the captured data is determined to be altered. The server may be configured to generate the indication of the authenticity of the provided captured data by generating one or more of a numerical indication, a textual indication, a graphic indication, or a combination thereof associated with the authenticity of the provided captured data. The server may be configured to generate the context information by generating a comparison of the source information with a corresponding characteristic of the provided captured data. The server may be configured to generate the alteration information by generating an indication of when, how, where, which portion, or by whom, the captured data was altered. The server may be configured to make the captured data available along with the authentication information by providing the captured data along with the authentication information to one or more of a computing device associated with a consumer of the captured data, a server for analysis, storage, or distribution, or an artificial intelligence (AI) module for analysis. The captured data may include one or more of audio data, video data, textual data, graphic data, sensor data, or a combination thereof.

According to other examples, a method to provide captured analog data with continuous authentication chain of custody is described. The method may include receiving or capturing analog data; one of: capturing along with the analog data or inserting into the analog data an authentication signal; while the captured analog data is in a system for one or more of distribution, processing, or storage, examining an authenticity of the captured analog data one or more times using authentication signal; generating authentication information for the captured analog data based on the examining; and making the captured analog data available along with the authentication information, wherein the captured analog data made available is declared as being original or authentic based on the authentication information.

According to further examples, the authentication signal may include one or more of a visible video signal, an invisible video signal, an audible audio signal, or an inaudible audio signal. The invisible video signal may include one or more of an infrared video signal or an ultraviolet video signal. The inaudible audio signal may include a signal outside human hearing spectrum. The authentication signal may be correlated with a content of the captured analog data. The authentication signal may be independent of a content of the captured analog data. The method may further include one of embedding the authentication information into the captured analog data in the digital format or storing the authentication information in a separate file. The authentication signal may be generated based on a source information that comprises one or more of an identity of a person associated with the captured analog data, an identity of a location associated with the captured analog data, a time stamp, a geo-location stamp, a length of the captured analog data, a portion of the captured analog data, a creator of the captured analog data, a person included in the captured analog data, a time of capture of the captured analog data, a date of capture of the captured analog data, a capture device, a method of capture for the captured analog data, or a combination thereof.

According to yet other examples, examining the authenticity of the captured analog data one or more times may include comparing a current version and a previous version of the authentication signal. Examining the authenticity of the captured analog data one or more times may include examining the authenticity of the captured analog data at one or more hardware or software components of the system; or examining the authenticity of the captured analog data based on a system or user defined time period. A number of examinations of the authenticity of the captured analog data may be determined based on a type of the captured analog data or a desired level of confidence. Generating the authentication information for the captured analog data may include generating one or more of an indication of the authenticity of the provided captured analog data, context information, and alteration information if the captured analog data is determined to be altered. Generating the indication of the authenticity of the provided captured analog data may include generating one or more of a numerical indication, a textual indication, a graphic indication, or a combination thereof associated with the authenticity of the provided captured analog data. Generating the alteration information may include generating an indication of when, how, where, which portion, or by whom, the captured analog data was altered.

According to some examples, a number and a schedule of examinations of the authenticity of the captured analog data may be determined based on a trigger event. The trigger event may include one or more of receiving confirmation of purchase or lease of the captured analog data from the consumer of the captured analog data, receiving a law enforcement request, receiving a legal request, receiving an instruction from a creator of the captured analog data, receiving an instruction from a consumer of the captured analog data, or receiving an instruction from a third-party entity. The method may further include determining a retention schedule for storing the captured analog data based on the authentication information. The captured analog data may include one or more of audio data, video data, sensor data, or a combination thereof. The captured analog data may be acquired by one or more of a sound recorder, a video recorder, an image capture device, a text capture device, a graphic capture device, a touch capture device, a computing device, a data acquisition device, or a sensor. The sensor may include a biologic sensor, a chemical sensor, a mechanical sensor, an electrical sensor, an optical sensor, an electromagnetic sensor, a physiological sensor, a motion sensor, a health sensor, an indoor environmental sensor, an outdoor environmental sensor, a security sensor, a geologic sensor, and a state sensor.

There are various vehicles by which processes and/or systems and/or other technologies described herein may be affected (e.g., hardware, software, and/or firmware), and the preferred vehicle will vary with the context in which the processes and/or systems and/or other technologies are deployed. For example, if an implementer determines that speed and accuracy are paramount, the implementer may opt for mainly hardware and/or firmware vehicle; if flexibility is paramount, the implementer may opt for mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination or sequence thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disk (DVD), a digital tape, a computer memory, a solid state drive (SSD), etc. (essentially any apparatus capable of storing data in a digital or analog format); and a transmission type medium such as a digital and/or an analog communication medium (e.g., a fiber optic cable, a waveguide, a wired communication link, a wireless communication link, etc.), essentially any apparatus capable of transferring data in a digital or analog format from one location to another.

It is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, a microphone or similar audio input device, any image capture device (still or moving), and/or control systems.

A data processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components. The functionality described herein may be accomplished on a dedicated system (i.e., components dedicated to performing the tasks and operations described herein) or a non-dedicated system (i.e., components configured to perform other, unrelated tasks as well).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

The invention claimed is:

1. A method to provide captured data with continuous authentication chain of custody, the method comprising:
  receiving, in a digital format, the captured data;
  receiving source information associated with at least one source for the captured data;
  capturing one or more characteristics of the captured data prior to any encoding of the captured data,
  wherein the one or more captured characteristics of the captured data are different from the source information associated with the at least one source for the captured data;
  while the captured data is in a system for one or more of distribution, processing, or storage, examining an authenticity of the captured data one or more times using the captured data, the one or more captured characteristics of the captured data, and the source information for the captured data based on a previous examination,
  wherein a number of examinations of the authenticity of the captured data is determined based on a combination of a type of the captured data, a desired level of confidence, and a number of user devices accessing the captured data;
  generating authentication information for the captured data based on the examining; and making the captured data available in an encoded or non-encoded form along with the authentication information, wherein the captured data made available is declared as being original or authentic based on the authentication information.

2. The method of claim 1, wherein
capturing the one or more characteristics of the captured data comprises:
capturing one or more of a size, a shape, a number of bits, a number of bytes, a granularity, a timing, a cyclical redundancy check (CRC), a multi-dimensional CRC, a number of '1's and '0's, or a size of strings of characters of at least a portion of the captured data; and
the source information comprises one or more of an identity of a person associated with the captured data, an identity of a location associated with the captured data, a time stamp, a geo-location stamp, a length of the captured data, a portion of the captured data, a creator of the captured data, a person included in the captured data, a time of capture of the captured data, a date of capture of the captured data, a capture device, a unique identifier associated with the capturing device, a method of capture for the captured data, or a combination thereof.

3. The method of claim 2, further comprising:
one of embedding the authentication information into the captured data or storing the authentication information in a separate file.

4. The method of claim 1, wherein examining the authenticity of the captured data one or more times comprises:
comparing a current version and a previous unaltered version of the captured data while the captured data is being transported, distributed, processed, or stored in the system;
comparing one or more of the one or more captured characteristics of the captured data, the source information for the captured data, or a combination thereof;
examining the authenticity of the captured data at one or more hardware or software components of the system;
examining the authenticity of the captured data as the captured data in the digital format is transitioned between one or more hardware or software components of the system; or
examining the authenticity of the captured data based on a system defined time period, a user defined time period, a periodic time period, or an aperiodic time period.

5. The method of claim 1, wherein
generating the authentication information for the captured data comprises:
generating one or more of an indication of the authenticity of the captured data, context information, and alteration information when the captured data is determined to be altered; and
generating the indication of the authenticity of the captured data comprises:
generating one or more of a numerical indication, a textual indication, a graphic indication, an audio indication, a visual indication or a combination thereof associated with the authenticity of the captured data;
generating the context information comprises:
generating a comparison of the source information with a corresponding characteristic of the captured data; and
generating the alteration information comprises:
generating an indication of when, how, where, which portion, by whom, or a combination thereof, the captured data was altered.

6. The method of claim 1, wherein making the captured data available along with the authentication information comprises:
providing the captured data along with the authentication information to one or more of:
a computing device associated with a consumer of the captured data,
a server for analysis, storage, or distribution, or
an artificial intelligence (AI) module for analysis.

7. The method of claim 1, further comprising:
generating a signature based on the authentication information, wherein the signature comprises a cryptographic hash function, an overlay, a logo, a marker detectable by human senses, a marker not detectable by human senses, or a combination thereof; and
signing the captured data with the signature or storing the signature separately from the captured data or in a distributed fashion while making the captured data available.

8. The method of claim 1, wherein
a number and a schedule of examinations of the authenticity of the captured data is determined by an AI module, a separate server, or based on a trigger event, the trigger event including one or more of receiving confirmation of purchase or lease of the captured data from a consumer of the captured data, receiving a law enforcement request, receiving a legal request, receiving an instruction from a creator of the captured data, a sale of goods or services, receiving an instruction from the consumer of the captured data, or receiving an instruction from a third-party entity.

9. The method of claim 1, wherein making the captured data available comprises:
making the captured data available along with the authentication information for a predefined time period, wherein the predefined time period is based on an authentication signature associated with the authentication information.

10. A system to provide captured data with continuous authentication chain of custody, the system comprising:
a data capture device configured to:
capture data; and
upon detecting a trigger event, provide the data;
a first computing device configured to:
receive the data as captured data in the digital format; and
a second computing device, configured to:
receive source information associated with at least one source for the captured data;
capture one or more characteristics of the captured data prior to any encoding of the captured data, wherein the one or more captured characteristics of the captured data are different from the source information associated with the at least one source for the captured data;
examine an authenticity of the captured data one or more times using the captured data, the one or more captured characteristics of the captured data, and the source information for the captured data while the captured data is being transported, processed, or stored through one or more components of the system,
wherein a number of examinations of the authenticity of the captured data is determined based on a combination of a type of the captured data, a desired level of confidence, and a number of user devices accessing the captured data; and generate authentication information for the captured data based on the examining; and a third computing device, configured to:

receive the captured data and the authentication information from the second computing device; and make the captured data available in an encoded or non-encoded form along with the authentication information, wherein the captured data made available is declared as being original or authentic based on the authentication information.

11. The system of claim 10, wherein the data capture device is configured to:

capture analog data or digital data.

12. The system of claim 10, wherein the one or more characteristics of the captured data include one or more of a size, a shape, a number of bits, a number of bytes, a granularity, a timing, a cyclical redundancy check (CRC), a multi-dimensional CRC, a number of '1's and '0's, or a size of strings of characters of at least a portion of the captured data; and the source information comprises one or more of an identity of a person associated with the captured data, an identity of a location associated with the captured data, a time stamp, a geo-location stamp, a length of the captured data, a portion of the captured data, a creator of the captured data, a person included in the captured data, a time of capture of the captured data, a date of capture of the captured data, a capture device, a unique identifier associated with the capturing device, a method of capture for the captured data, or a combination thereof.

13. The system of claim 12, wherein the second computing device is configured to one or more of:

one of embed the authentication information into the captured data or store the authentication information in a separate file;

compare a current version and a previous version of the one or more of the captured data, the one or more captured characteristics of the captured data, the source information for the captured data, or a combination thereof;

examine the authenticity of the captured data at one or more hardware or software components of the system or by an artificial intelligence (AI) module;

examine the authenticity of the captured data as the captured data is transitioned between one or more hardware or software components of the system or a network; or examine the authenticity of the captured data based on a system or user defined time period.

14. The system of claim 10, wherein the second computing device is configured to:

generate the authentication information for the captured data by:

generating one or more of an indication of the authenticity of the captured data, context information, and alteration information when the captured data is determined to be altered;

generate the indication of the authenticity of the captured data by:

generating one or more of a numerical indication, a textual indication, a graphic indication, an audio indication, a visual indication, or a combination thereof associated with the authenticity of the captured data;

generate the context information by:

generating a comparison of the source information with a corresponding characteristic of the captured data; or generate the alteration information by:

generating an indication of when, how, where, which portion, or by whom, the captured data was altered.

15. The system of claim 10, wherein the third computing device is configured to make the captured data available along with the authentication information by:

providing the captured data along with the authentication information to one or more of:

a computing device associated with a consumer of the captured data, a server for analysis, storage, or distribution, or an artificial intelligence (AI) module for analysis.

16. The system of claim 10, wherein a number and a schedule of examinations of the authenticity of the captured data is determined by an AI module, a separate server, or based on the trigger event, the trigger event including one or more of receiving confirmation of purchase or lease of the captured data from a consumer of the captured data, receiving a law enforcement request, receiving a legal request, receiving an instruction from a creator of the captured data, receiving an instruction from the consumer of the captured data, or receiving an instruction from a third-party entity.

17. The system of claim 16, wherein the AI module is configured to automatically sense alteration of the captured data and store examined data when the captured data is altered.

18. The system of claim 10, wherein the data capture device is one or more of a sound recorder, a video recorder, an image capture device, a text capture device, a graphic capture device, a touch capture device, a computing device, a data acquisition device, or a sensor; and the sensor includes a biologic sensor, a chemical sensor, a mechanical sensor, an electrical sensor, an optical sensor, an electromagnetic sensor, a physiological sensor, a motion sensor, a health sensor, an indoor environmental sensor, an outdoor environmental sensor, a security sensor, a geologic sensor, a state sensor, a body-worn sensor, a sensor mounted on a device, or a combination thereof.

19. The system of claim 10, wherein the second computing device is further configured to:

one or more of analyze, encrypt, filter, compress, decompress, reformat, copy, or store the captured data.

20. The system of claim 10, wherein two or more of the first computing device, the second computing device, and the third computing device are integrated as a single computing device.

21. The system of claim 10, wherein the data capture device is further configured to:

at least partially process or store the captured data; and compare the at least partially processed or stored data to the captured data before providing to the first computing device.

22. A data capture device to provide captured data with continuous authentication chain of custody, the data capture device comprising:

a communication device configured to facilitate communications with one or more computing devices;

a memory; and a processor coupled to the communication device and the memory, the processor, in conjunction with instructions stored in the memory, configured to:

receive, in a digital format, the captured data;

receive or capture source information associated with at least one source for the captured data;

capture one or more characteristics of the captured data prior to any encoding of the captured data, wherein the one or more captured characteristics of the captured data are different from the source information associated with the at least one source for the captured data;

examine an authenticity of the captured data one or more times using the captured data, the one or more captured characteristics of the captured data, and the source information for the captured data based on a previous examination,
 wherein a number of examinations of the authenticity of the captured data is determined based on a combination of a type of the captured data, a desired level of confidence, and a number of user devices accessing the captured data;

generate authentication information for the captured data based on the examining; and make the captured data available in an encoded or non-encoded form along with the authentication information such that, while the captured data is in a system for one or more of distribution, processing, or storage, an authenticity of the captured data is analyzable one or more times using one or more of the captured data, the one or more captured characteristics of the captured data, and the source information for the captured data.

23. The data capture device of claim 22, wherein the one or more characteristics of the captured data include one or more of a size, a shape, a number of bits, a number of bytes, a granularity, a timing, a cyclical redundancy check (CRC), a multi-dimensional CRC, a number of '1's and '0's, or a size of strings of characters of at least a portion of the captured data;

the processor is configured to one of embed the authentication information into the captured data or store the authentication information in a separate file; and the source information comprises one or more of an identity of a person associated with the captured data, an identity of a location associated with the captured data, a time stamp, a geo-location stamp, a length of the captured data, a portion of the captured data, a creator of the captured data, a person included in the captured data, a time of capture of the captured data, a date of capture of the captured data, a capture device, a unique identifier associated with the capturing device, a method of capture for the captured data, or a combination thereof.

24. The data capture device of claim 22, wherein the processor is configured to:

generate the authentication information for the captured data by:

generating one or more of an indication of the authenticity of the captured data and context information;

generate the indication of the authenticity of the captured data by:

generating one or more of a numerical indication, a textual indication, a graphic indication, an audio indication, visual indication or a combination thereof associated with the authenticity of the captured data; and generate the context information by:

generating a comparison of the source information with a corresponding characteristic of the captured data.

25. The data capture device of claim 22, wherein the processor is further configured to:

generate a signature based on the authentication information; and sign the captured data with the signature, wherein the signature comprises a cryptographic hash function, an overlay, a logo, a marker detectable by human senses, a marker not detectable by human senses, or a combination thereof.

26. The data capture device of claim 22, wherein the captured data comprises one or more of audio data, video data, textual data, graphic data, sensor data, or a combination thereof;

the captured data is acquired by one or more of a sound recorder, a video recorder, an image capture device, a text capture device, a graphic capture device, a touch capture device, a computing device, a data acquisition device, or a sensor; and the sensor includes a biologic sensor, a chemical sensor, a mechanical sensor, an electrical sensor, an optical sensor, an electromagnetic sensor, a physiological sensor, a motion sensor, a health sensor, an indoor environmental sensor, an outdoor environmental sensor, a security sensor, a geologic sensor, and a state sensor.

* * * * *